US012573278B2

(12) United States Patent
Abbas et al.

(10) Patent No.: US 12,573,278 B2
(45) Date of Patent: Mar. 10, 2026

(54) REMOTE VEHICLE CHILD MONITORING SYSTEMS AND METHODS

(71) Applicant: Veoneer US, LLC, Southfield, MI (US)

(72) Inventors: Samer Abbas, Dearborn Heights, MI (US); Ryan Moore, Southfield, MI (US); Omar Alhaider, Southfield, MI (US); Erick Lavoie, Van Buren Township, MI (US)

(73) Assignee: Magna Electronics, LLC, Southfield, MI (US)

( * ) Notice: Subject to any disclaimer, the term of this patent is extended or adjusted under 35 U.S.C. 154(b) by 45 days.

(21) Appl. No.: 18/583,706

(22) Filed: Feb. 21, 2024

(65) Prior Publication Data

US 2025/0265916 A1 Aug. 21, 2025

(51) Int. Cl.

| | |
|---|---|
| ***G08B 21/02*** | (2006.01) |
| ***G08B 7/06*** | (2006.01) |
| ***G08B 21/22*** | (2006.01) |

(52) U.S. Cl.

CPC ........... *G08B 21/0208* (2013.01); *G08B 7/06* (2013.01); *G08B 21/0269* (2013.01); *G08B 21/22* (2013.01)

(58) Field of Classification Search

CPC .. G08B 21/0208; G08B 7/06; G08B 21/0269; G08B 21/22

USPC ........................................................ 340/573.1

See application file for complete search history.

(56) References Cited

U.S. PATENT DOCUMENTS

| | | | | |
|---|---|---|---|---|
| 11,230,246 | B1 * | 1/2022 | Beach | B60R 21/01512 |
| 2017/0129399 | A1 | 5/2017 | Appukutty et al. | |
| 2020/0111339 | A1 * | 4/2020 | Holt | G08B 21/0476 |
| 2020/0282803 | A1 | 9/2020 | Upmanue et al. | |
| 2020/0285870 | A1 * | 9/2020 | Yi | B60R 1/29 |
| 2022/0215734 | A1 * | 7/2022 | Pozzini | G08B 21/0288 |
| 2022/0227259 | A1 * | 7/2022 | Sajovic | G08B 21/22 |
| 2022/0305988 | A1 * | 9/2022 | Xi | G08B 25/016 |
| 2023/0156827 | A1 * | 5/2023 | Orpaz | H04W 76/50 370/329 |
| 2023/0219526 | A1 * | 7/2023 | Wisnia | B60R 25/209 701/2 |

FOREIGN PATENT DOCUMENTS

| | | |
|---|---|---|
| CN | 112622713 | 4/2021 |
| DE | 102010053531 | 6/2012 |
| WO | 201470722 | 5/2014 |

* cited by examiner

*Primary Examiner* — Kerri L Mcnally

(74) *Attorney, Agent, or Firm* — Matthew D. Thayne; Thayne and Davis LLC

(57) ABSTRACT

Methods and systems for remote child monitoring within a vehicle. In some implementations, the method may comprise method may comprise receiving a signal in a vehicle from a remote device requesting that one or more seats in the vehicle be monitored and monitoring a child within the one or more seats using one or more sensors within the vehicle to attempt to identify a plurality of status indicators relating to the child. Signals received from the one or more sensors may be processed to categorize a current safety state of the child within one of a plurality of safety state categories using the plurality of status indicators. A signal may then be transmitted to the remote device indicative of a real-time safety state of the child within a corresponding safety state category of the plurality of safety state categories.

10 Claims, 12 Drawing Sheets

REMOTE VEHICLE CHILD MONITORING SYSTEMS AND METHODS

SUMMARY

RADAR is often used to detect objects exterior to a vehicle, such as other vehicles, pedestrians, and obstacles. However, RADAR, or other electromagnetic radiation signals, such as near-infrared cameras, are not typically directed inward toward occupants of the cabin, let alone to monitor important conditions that may provide vital information about the safety of the occupants.

In addition, watching children while driving, either by way of looking in a mirror or turning one's head around towards the rear of the vehicle, can be a dangerous distraction to drivers. In fact, even when drivers are not sufficiently distracted to look at children in rear seats, children may be a distraction resulting in cognitive load and possible danger to the driver and all occupants in the vehicle. Moreover, there may be dangers to children during driving, even apart from dangers created by the distractions they present to the driver, such as choking, improper seating positions, improper seat belt conditions, for example.

Further, parents and/or other primary caregivers who may not be present in a vehicle, such as an autonomous vehicle or a vehicle being driven by a temporary guardian, may wish to but be unable to monitor their dependent(s) while they are travelling in such a situation. Similarly, such primary caregivers may wish to interact with their dependent(s) during the journey.

The present inventors have therefore determined that it would be desirable to provide systems and methods that overcome one or more of the foregoing limitations and/or other limitations of the prior art. Systems and methods for monitoring the health and/or safety of children within a vehicle are therefore disclosed herein.

Thus, in some embodiments and implementations, the inventive concepts disclosed herein may be used to detect conditions, which may include behaviors, events, and other conditions pertinent to, for example, the health, safety, and/or mood of one or more children in the vehicle. Some embodiments may be configured to classify such children and/or other vehicle occupants using data from various internal sensors, such as RADAR sensors, near-infrared (NIR) cameras, visible camera sensors, LIDAR sensors, and the like, and take various actions using such data, such as providing notifications to the driver or other adult vehicle occupants, in some cases by way of a series of icons on a display and/or user interface of the vehicle.

In some embodiments and implementations, an in-vehicle system for monitoring children/occupants may be communicatively coupled with a remote device having non-transitory, computer-readable storage medium storing instructions that, when executed, cause the remote device to perform various methods in which the remote device can access data from the in-vehicle system. For example, a user of the remote device may be able to be notified whenever one or more of the children/occupants in the vehicle are in potential danger due to, for example, choking, improper seating position, a vehicle accident, an ambient air temperature and/or body temperature out of a preferred range, a breathing rate and/or heart rate out of an expected range, or the like. Similarly, a user of the remote device may be notified during other events/conditions, such as when the child/occupant wakes up and/or goes to sleep, when the vehicle has stopped and/or a driver has exited the vehicle, etc. A user of the remote device may also, or alternatively, be able to interact with occupants and/or the driver of the vehicle, including communicating with them and/or viewing them using cameras within the vehicle.

In a more particular example of a system for automated monitoring of a child within a vehicle, the system may comprise one or more sensors positioned within a cabin of a vehicle, such as RADAR sensors, visible light cameras, NIR cameras, LIDAR cameras, thermal imaging sensors, temperature sensors, microphones/sound sensors, and the like. The one or more sensors may be configured to monitor one or more children in the cabin.

The system may further comprise a safety categorization module configured to receive and process signals from the one or more sensors. The safety categorization module may be configured to process data from the one or more sensors to categorize the one or more children within a plurality of safety state categories, in some cases one of at least three safety state categories, which may be indicative of a current safety state of the child.

The system may further comprise a user interface within the vehicle communicatively coupled with the safety categorization module and configured to display an icon indicative of a current safety state of the child from among the at least three safety state categories.

In some embodiments, at least one of the one or more sensors may be configured to identify a vital sign associated with the child.

In some embodiments, the user interface may be configured to display an icon having a distinct color indicative of a current safety state category of the child to a driver of the vehicle on a display.

In some embodiments, the at least three safety state categories may comprise an urgent safety state category indicative of a current safety state of the child requiring immediate attention; an intermediate safety state category indicative of a current safety state of the child that may be of concern but does not require immediate attention; and a normal category indicating that no safety concerns for the child have been detected by the one or more sensors.

In some such embodiments, the system may be configured to display an icon associated with the urgent safety state category upon detection by the one or more sensors of one or more (in some cases, all) of the following conditions by a child: choking of the child detected via a RADAR sensor; a body temperature of the child outside of a predetermined temperature range measured by a thermal imaging sensor; an improper seatbelt condition detected by a camera or seatbelt sensor; and an unsafe body pose of the child detected via a camera (such as a visible light camera and/or NIR camera) or RADAR sensor.

In some embodiments, the intermediate safety state category may be customizable by a user. For example, some embodiments may allow for selective enabling of criteria detected by the one or more sensors that will trigger display of an icon associated with the intermediate safety state category. Some embodiments may allow for selective enabling of the types of notifications (such as visible, audible, and/or haptic) that are associated with the intermediate safety state category, or other safety state categories. Some embodiments may additionally, or alternatively, allow for selective enabling of the types of notifications that are associated with one or more of the individual conditions detected by the system.

In some embodiments, the urgent safety state category may correspond with a red icon, the intermediate safety state category may correspond with a yellow icon, and/or the normal category corresponds with a green icon.

In some embodiments, the at least three safety state categories further comprise a sleeping category indicating that the child is asleep.

In an example of a method for automated monitoring of a child within a vehicle according to some implementations, the method may comprise monitoring one or more seats within a vehicle using one or more sensors positioned within a cabin of the vehicle; upon detecting the presence of a child within at least one seat of the one or more seats, monitoring the child using the one or more sensors to attempt to identify a plurality of safety status indicators relating to the child; processing signals received from the one or more sensors to categorize a current safety state of the child within one of a plurality of safety state categories using the plurality of safety status indicators from the one or more sensors; and providing a display to a driver of the vehicle indicative of a real-time safety state of the child within a corresponding safety state category of the plurality of safety state categories.

In some implementations, the plurality of safety state categories may comprise at least three safety state categories, among which may include an urgent safety state category indicative of a current safety state of the child requiring immediate attention; an intermediate safety state category indicative of a current safety state of the child that may be of concern but does not require immediate attention; and a normal category indicating that no safety concerns for the child have been detected by the one or more sensors.

Some implementations may further comprise, upon detecting a condition triggering the urgent safety state category, displaying a real-time video image of the child on the display.

In some implementations, the one or more sensors may comprise at least a camera and a RADAR sensor.

Some implementations may further comprise repeatedly seeking detection of a choking condition of the child, which may be performed using a RADAR sensor and/or may be based upon a detected breathing rate of the child. Some implementations may further comprise repeatedly seeking detection of an unsafe body pose condition of the child, which may be performed using a camera, such as an NIR camera, and/or a RADAR sensor. Some implementations may further comprise repeatedly seeking detection of an improper seatbelt condition associated with the child, which may be performed using a seatbelt sensor, camera, and/or RADAR sensor. In some implementations, upon detection of any of the foregoing conditions, an icon indicative of the urgent safety state category may be displayed on a display and/or user interface.

Some implementations may further comprise accepting input on a user interface indicative of a selection from among a plurality of optional safety state conditions to be associated with the intermediate safety state category. The optional safety state conditions may comprise, for example, detection of an object in the mouth of the child; detection of an object being dropped by the child; detection of vomit from the child; detection of crying and/or discomfort by the child an unsafe body position, a sleeping condition, an unsafe body position, and an unsafe body temperature.

In an example of a computing device comprising a display within a vehicle according to some embodiments, the computing device may be configured to allow a driver of the vehicle to select one or more seats within the vehicle for child monitoring. The device may be configured to display an icon on the display indicative of a current safety state of a child in a selected seat (in some cases, multiple icons, each representative of a different seat/child in the vehicle). The icon being displayed that is indicative of the current safety state of the child may, in some embodiments, be selected from a group of icons. In some embodiments, each icon in the group may have a distinct color indicative of the current safety state of the child to the driver on the display.

In some embodiments, the computing device may be further configured to allow the driver to customize, at least in part, which detected conditions from within a plurality of conditions of the child are to correspond with at least one icon in the group of icons.

In some embodiments, the group of icons may comprise a red icon indicative of a current safety state of the child requiring immediate attention; a yellow icon indicative of a current safety state of the child that may be of concern but does not require immediate attention; and a green icon indicating that no safety concerns for the child have been detected.

In some embodiments, the group of icons may further comprise an icon indicative of a sleeping state of the child. In some such embodiments, the sleeping icon may comprise a blue icon.

In some embodiments, the computer device may further be configured to display one or more secondary icons on the display. The secondary icon(s) may be indicative of a specific safety condition, event, and/or behavior of the child. In some embodiments, the secondary icon may be displayed adjacent to and/or in close proximity to a primary icon associated with the child associated with the specific safety condition, event, and/or behavior. In some embodiments, the secondary icon may be selected from a plurality of secondary icons, each of which may comprise an image providing an immediate visual indication of the specific safety condition, event, and/or behavior to the driver.

In some implementations of a method for remote monitoring of an occupant, such as a child, within a vehicle, the method may comprise receiving a signal in a vehicle from a remote device requesting that one or more seats in the vehicle be monitored. A child or other occupant may then be monitored within the one or more seats using one or more sensors positioned within a cabin of the vehicle to attempt to identify a plurality of status indicators and/or conditions relating to the child/occupant. Signals received from the one or more sensors may then be processed to categorize a current safety state of the child within one of a plurality of safety state categories using the plurality of status indicators from the one or more sensors. A signal may then be sent to the remote device indicative of a real-time safety state of the child within a corresponding safety state category of the plurality of safety state categories.

In some implementations, each of at least a subset of the plurality of status indicators comprises a safety status indicator.

In some implementations, the remote device may comprise a mobile application stored on an electronic device, such as a smartphone, which may be configured to electronically communicate with the vehicle, such as with an occupant monitoring system of the vehicle.

Some implementations may further comprise determining whether the remote device is within the vehicle. In some such implementations, upon determining that the remote device is within the vehicle, a local device monitoring mode may be entered. In some cases, the local device monitoring mode may remove and/or change monitoring features within the remote device.

In some implementations, upon determining that the remote device is not within the vehicle, a remote device monitoring mode may be entered, wherein the remote device monitoring mode may remove, add, and/or changes monitoring features.

In some implementations, the remote device monitoring mode may comprise delivering alerts to the remote device indicative of a real-time safety state of the child within a corresponding safety state category of the plurality of safety state categories. In some cases, the alert may further indicate a specific condition of the child/occupant that triggered the alert and/or warranted inclusion in the safety state category.

In some implementations, the remote device monitoring mode may comprise facilitating real-time communication between the remote device and the vehicle and/or allowing for remote control of certain features within the vehicle. For example, the remote device monitoring mode may allow for audio and/or video communication and, or alternatively, may allow the remote device to control features such as HVAC/temperature control, windows, locks, etc.

Some implementations may allow users, either on the remote device or on a user interface within the vehicle, to assign specific alert features to specific conditions and/or categories of conditions. For example, in some implementations, an assignment may be received from a user of an icon, color, sound, and/or a haptic vibration pattern to a condition and/or safety state category of the child. Upon detecting a condition of the child corresponding to the assignment, a signal may then be transmitted to the remote device, which signal may be configured to trigger the remote device to issue an alert, the alert comprising the specific icon, color, sound, and/or haptic vibration pattern that the user chose to associate with the condition and/or the category triggered by the condition.

In other examples of methods for remote monitoring of an occupant within a vehicle, the method may comprise monitoring an occupant, such as a child, within a vehicle using one or more sensors positioned within a cabin of the vehicle; correlating sensed data obtained during the monitoring step with a preconfigured set of conditions to identify a match between the data and at least one condition from among the set of conditions. A current condition of the occupant may then be identified from the sensed data, in some cases along with a category including a plurality of conditions within which the current condition is present. An alert may then be sent to a remote device of the condition and/or category.

Some implementations may further comprise categorizing the at least one condition within one of a plurality of safety state categories. In some cases, an indicator of the at least one condition may be included with the alert transmitted to the remote device. For example, the indicator may be an icon, a color, an outline/overlay on a video and/or image, a sound, and/or a haptic vibration pattern.

Some implementations may further comprise receiving customization data from the remote device. The customization data may comprise, for example, an assignment by a user of an icon, a color, an outline/overlay on a video and/or image, a sound, and/or a haptic vibration pattern to a particular condition and/or a safety state category.

Some implementations may further comprise obtaining a current location of the remote device and/or the vehicle using, for example, a GPS sensor within the vehicle and/or within the remote device. Data relating to the legal framework within the current location may then be obtained regarding leaving children within a vehicle. For example, data relating to a plurality of legal frameworks may be stored within the vehicle and/or remote device. Alternatively, data relating to the current legal framework may be obtained via remote data query to a source for such data, such as an online authority or a database maintained by the vehicle manufacturer and/or app distributor. One or more features and/or functions of a system for automated monitoring of the child within the vehicle may then be updated according to the legal framework in the current location.

For example, the step of updating a function may comprise changing the parameters under which an alert will be sent to the remote device when the child is in the vehicle without adult supervision according to the current legal framework. More specifically, the timing and/or content of alerts to guardians and/or users of the remote device may be varied according to the current legal framework for leaving children unsupervised with a vehicle.

In some cases, the features and/or functions of the system may also be altered according to other real-time parameters, such as the ambient temperature inside or outside of the vehicle, the time of day (whether there is daylight, for example), or whether the vehicle is inside a structure or parked outside, for example.

In an example of a system for automated, remote monitoring of an occupant within a vehicle according to some embodiments, the system may comprise one or more sensors positioned within a cabin of a vehicle, wherein the one or more sensors are configured to monitor an occupant, such as a child, in the cabin. The system may further comprise a communications link configured to facilitate electronic communication with a remote device. A safety categorization module of the system may be configured to receive and process signals from the one or more sensors, which safety categorization module may be configured to continuously process data from the one or more sensors to categorize the occupant within one of a plurality of safety state categories indicative of a current safety state of the occupant.

The system may further comprise a microphone coupled with the communications link and configured to transmit electronic signals generated from voices within the cabin to the remote device and/or a speaker coupled with the communications link and configured to receive electronic signals from the remote device to allow for verbal communication from a user of the remote device to the occupant in the cabin.

In some embodiments, the remote device may be loaded with mobile application configured to facilitate communication, change monitoring settings, allow for remotely operating certain vehicle functions, etc. In some such embodiments, the mobile application may be configured to receive an alert whenever the safety categorization module changes a safety state category of the occupant and/or when a particular condition indicative of a current status and/or safety of the occupant is detected.

Some embodiments may further comprise a video camera that is communicatively coupled with the communications link to allow for a live video feed of the occupant to be transmitted to the remote device. Thus, some embodiments may further allow for video conferencing/communicating between children or other occupants being monitored by using cameras in the vehicle and transmitting video feeds from the vehicle to a display of the remote device.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
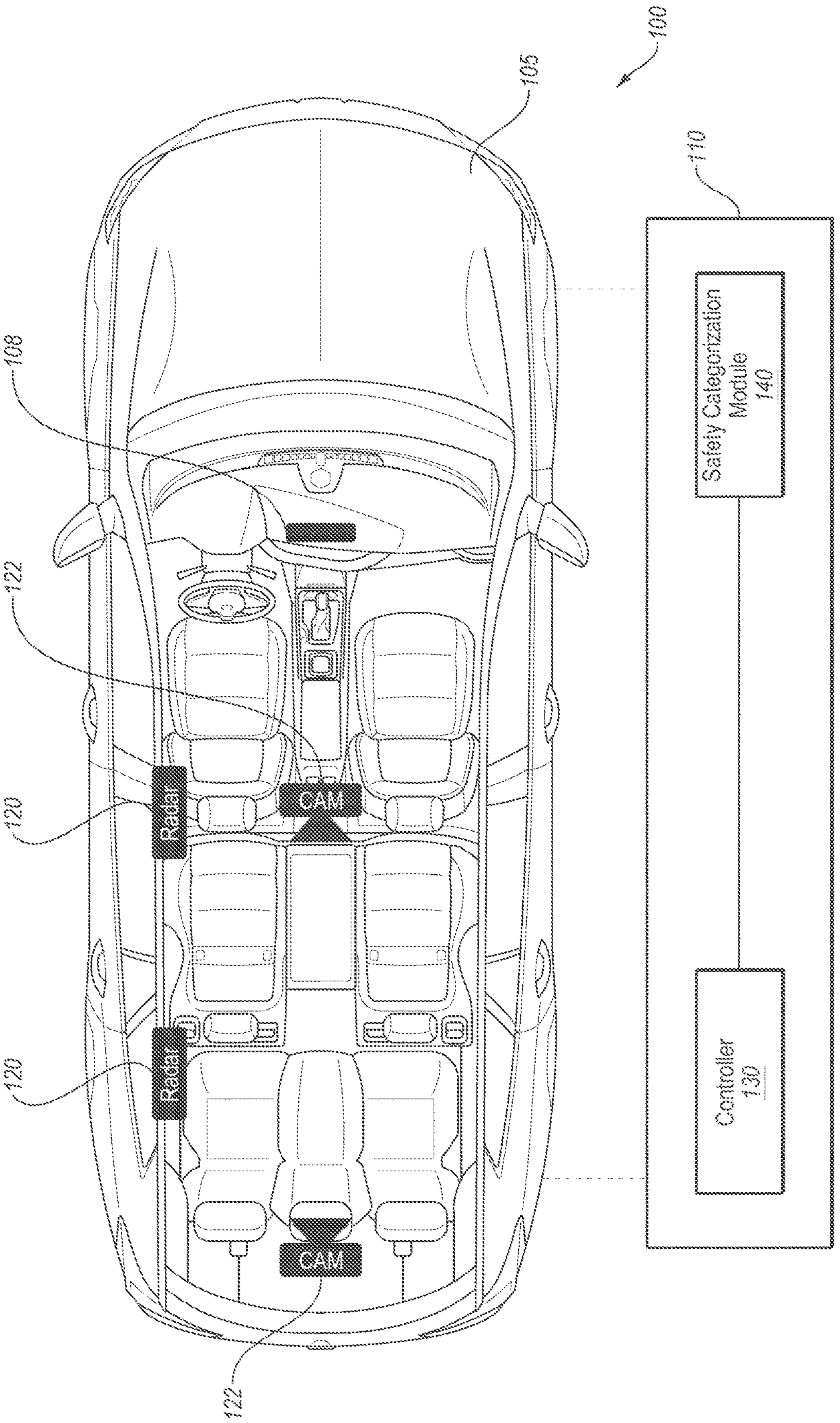
FIG. 1 depicts a vehicle comprising a system for monitoring the safety of one or more vehicle occupants, such as children, according to some embodiments.

It will be readily understood that the components of the present disclosure, as generally described and illustrated in the drawings herein, could be arranged and designed in a wide variety of different configurations. Thus, the following more detailed description of the embodiments of the apparatus is not intended to limit the scope of the disclosure but is merely representative of possible embodiments of the disclosure. In some cases, well-known structures, materials, or operations are not shown or described in detail.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

FIG. 1 depicts a system 100 for monitoring the health and/or safety of one or more vehicle occupants, such as one or more children, within the cabin of a vehicle 105. As shown in this figure, one or more sensors may be positioned at various locations within the cabin of vehicle 105. In the depicted embodiment, vehicle 105 comprises four sensors, two of which are RADAR sensors 120 and two of which are cameras 122, such as visible light cameras/sensors or NIR cameras.

Although this is but an example, and those of ordinary skill in the art will appreciate that a variety of alternative configurations are possible, in the example of FIG. 1 there is a first camera 122 positioned in a central location within the cabin and configured to orient its field of view rearward towards the second row of seats. Another camera 122 is positioned at the rear of the vehicle and is configured to orient its field of view forward towards the third and second rows of seats. Again, a variety of alternative configurations are possible, and are contemplated. For example, a camera may also be placed in the first/driver row of seats, such as along the front console, either in addition to or as an alternative to the two cameras 122 depicted in FIG. 1.

Similarly, although the two RADAR sensors 120 are shown positioned along one side of the cabin of vehicle 105, each of which is configured to detect movements associated with occupants in different rows, a variety of alternative configurations are both possible, and contemplated. Indeed, as those of ordinary skill in the art will appreciate, different numbers of sensors, different types of sensors, and different locations of sensors may be used.

For example, the locations of the RADAR sensors 120 and cameras 122 may be swapped. Alternatively, one or more RADAR sensors 120 and/or cameras 122 may be positioned along the front console, roof/ceiling or the upper side of a vehicle pillar, within seats of the vehicle, and/or in the floor of the vehicle.

In addition, in some embodiments including RADAR sensors, such sensors may comprise frequency modulated continuous wave (FMCW) ultra-wide band RADAR sensor configured to operate at 60 GHz. However, in alternative embodiments, other types of sensors may be used, such as LIDAR, infrared, NIR cameras, ToF sensors/cameras, or other types of electromagnetic sensors, for example. In addition, other types of sensors may be used, some uses of which will be apparent after reviewing this disclosure in its entirety. Such sensors include, for example, temperature sensors, thermal imaging sensors, accelerometers, noise/sound sensors, weight and/or pressure sensors, seatbelt sensors, and the like.

An unsafe seatbelt condition may be detected, for example, by a seatbelt sensor, a retractor position, a camera, or the like. An unsafe body pose/position may be detected by, for example, a camera. This condition may be triggered, for example, by looking for a child's head bent sufficiently, such as a threshold angle, to one side or forward, a child facing sideways, backwards, or laying down, a child out of a seat in which they were formerly seated, etc.

Each of the various sensors may be configured to direct electromagnetic signals to and/or receive electromagnetic signals from particular regions of the cabin of vehicle 105, preferably so as to at least be capable of detecting movements and/or characteristics of occupants, such as children in preferred embodiments, within one or more target seats of the vehicle 105. Of course, again, many alternatives are contemplated and/or would be available to those of ordinary skill in the art after having received the benefit of this disclosure. For example, a single sensor positioned at a suitable location may, for some vehicles, be sufficient to adequately detect occupants in multiples seats, or even every seat in the vehicle for some embodiments. Similarly, in other embodiments, it may be desirable to provide a dedicated RADAR or other electromagnetic sensor for each seat of the vehicle.

As described in greater detail below, irrespective of the placement, number, and type of electromagnetic sensors used in the vehicle, in preferred embodiments, such sensor(s) may be used to identify one or more occupants, such as children in preferred embodiments, present in the cabin and identify data indicative of the health and/or safety of such occupant(s). For example, in some embodiments, vital sign data, such as breathing rates, tidal volume changes, and/or heart rates, for example, may be detected using the sensor(s). Other types of data used for this purpose include, for example, seatbelt position data, body position data, skin temperature data, unexpected object data (such as objects in the mouth of a child), etc.

Examples of in-cabin sensor systems that detect and/or classify vehicle occupants using, for example, vital signs, can be found in U.S. patent application Ser. No. 18/072,662 titled "SYSTEMS AND METHODS FOR VEHICLE OCCUPANT VITAL SIGN DETECTION," which was filed on Nov. 30, 2022, along with U.S. patent application Ser. No. 18/072,662 titled "SYSTEMS AND METHODS FOR VEHICLE OCCUPANT CLASSIFICATION USING IN-CABIN SENSING," which was also filed on Nov. 30, 2022, both of which are hereby incorporated herein by reference in their entireties.

In some embodiments, one or more of the various sensors 120/122 may comprise sensor modules that may further comprise various other software, hardware, and/or firmware elements as desired in order to send and receive signals for processing by other modules. Although preferred embodiments may comprise and/or be limited to electromagnetic radiation sensors, it is contemplated that sensors 120/122 may instead, in some embodiments, comprise any other sensor as desired, such as a scale/weight/pressure sensor, temperature sensor, thermal imaging sensor, seatbelt sensor, any other sensor mentioned herein, or the like, for example.

Vehicle 105 may further comprise a system 110 for monitoring occupants within the vehicle. System 110 may comprise a controller 130, which may be configured to process data from sensors/sensor modules 120/122. As used herein, the term "controller" refers to a hardware device that includes a processor and preferably also includes a memory element. The memory may be configured to store one or more of the modules referred to herein and the controller 130 and/or one or more processors may be configured to execute the modules to perform one or more processes described herein.

System 110 further comprises a safety categorization module 140 that is communicatively coupled with one or more (or all) of the sensors/sensor modules 120/122. Of course, in some embodiments, a separate detection module may be provided for each sensor and/or sensor module, if desired. Safety categorization module 140 may be configured to receive raw, sensed data from the various sensors/sensor modules and attempt to identify/detect occupants within vehicle 105 using such data, such as by detecting evidence of breathing or another vital sign, as described above and throughout this disclosure as well as generate, receive, and/or process data useful for categorizing one or more children or other occupants in various safety/health categories based upon various movements, objects, features, characteristics associated with the data obtained from the sensor(s).

The data generated, received, and/or processed by safety categorization module 140 may be displayed on a display and/or user interface 108, which is preferably easily accessible by the driver of vehicle 105 (although for autonomous vehicles this need not be the case).

As described in greater detail below, in some embodiments, the data displayed on user interface 108, which may comprise a human machine interface in some embodiments, may comprise health and/or safety status data for one or more (each, in some embodiments) of the children in the vehicle 105. For example, in some embodiments, each child present in the vehicle 105 may be detected using, for example, heart and/or breathing rates, which may allow for detection of an approximate age or age range of the occupants to categorize them as a child (or adult). In some embodiments, a user may be allowed to manually select one or more seats in which a child is known to be present rather than rely on such automated detection features, however.

For each occupant identified as a child or identified by the driver/user as being a child, some embodiments may provide for automated categorization by safety categorization module 140 of each such child within one of a plurality of health/safety status levels. For example, in some embodiments, a default or normal status may be indicative of no health/safety problems having been detected. An intermediate category an intermediate safety state category may be used and may be indicative of a current safety state of the child that may be of concern but does not require immediate attention. Finally, an urgent safety state category may be used and may be indicative of a current safety state of the child requiring immediate attention.

For example, in some embodiments and related implementations, the intermediate category may be indicative of discomfort and/or reasons for possible discomfort by a child, such as crying, an unexpected object in the child's mouth, an object that had previously been held or otherwise retained by the child being dropped (such as a pacifier, bottle, toy, etc.), vomiting and/or spitting-up by the child, or slightly to moderately (but not dangerously) abnormal body and/or skin temperatures.

Similarly, in some embodiments and related implementations, the highest or urgent safety/health category may be indicative of a health and/or safety condition requiring or indicating the importance of immediate attention and possible action, such as: a choking condition, which may be, for example, detected via a RADAR sensor; a body and/or skin temperature of the child outside of a predetermined temperature range (which may be a temperature that is further afield from a normal/expected temperature than one which would trigger the intermediate category in some embodiments), which may be measured, for example by a thermal imaging sensor; an improper seatbelt condition, which may be detected, for example, by a camera or seatbelt sensor;

and/or an unsafe body pose of the child, which may be detected, for example, via a camera (such as a visual imaging camera or a NIR camera) or a RADAR sensor.

Various specific warnings and/or actions may be associated with each of the safety state categories. For example, upon detecting a condition indicative of a particular safety state category, such as a highest safety state category, the system 110 may be configured to provide a warning, such as a visual warning on user interface 108, an audible warning, which may be provided on the speakers in the sound system in vehicle 105, a tactile and/or haptic warning, such as a vibrational notification within one or more of the seats of vehicle 105, or the like. Some embodiments and implementations may also be configured to take other actions, such as displaying a live video display of the particular seat or seats within which the triggering condition(s) was detected. As another example, some embodiments and implementations may be configured to trigger a heightened scrutiny configuration for one or more of the sensor modules upon detecting a particular condition and/or upon placement of a particular occupant within a safety state category. Such configuration may, for example, devote more resources to monitoring this occupant and/or processing the data resulting from such monitoring.

Of course, a wide variety of alternative embodiments are contemplated and/or would be within the reach of those of ordinary skill in the art after having received the benefit of this disclosure. For example, some embodiments and implementations may include more, or less, than three safety state categories. Some such embodiments and implementations may, for example, only have a normal category and a single, heightened category that provides warnings, as described above. Other embodiments and implementations may provide more gradation in the categories and/or may provide a category devoted to a specific condition. For example, as described in greater detail below, some embodiments may provide a specific category indicative of a child sleeping.

As also described in greater detail below, in preferred embodiments and implementations, the user interface may be configured to display icons to the driver and/or another occupant of vehicle 105 to provide an immediate visual indicator for a current condition and/or safety state category of one or more of the child occupants. In some such embodiments and implementations, there may be an icon associated with the child/children and a separate, secondary, or supplemental icon for a particular condition that has been detected. In some such embodiments and implementations, the child icon may have a distinct color indicative of a current safety state category of the child to a driver or other occupant of the vehicle on a display and/or user interface.

Figure 2:
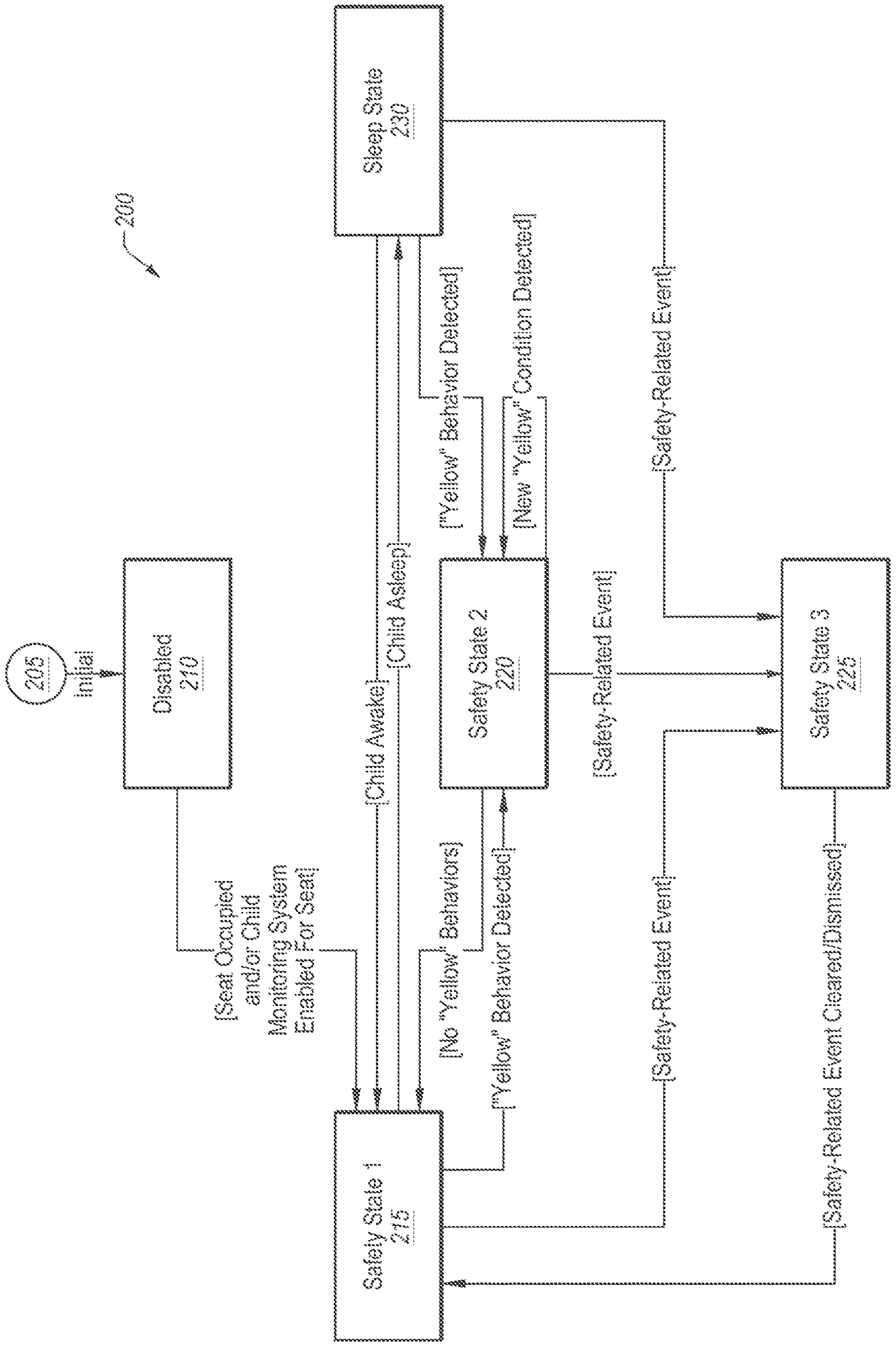
FIG. 2 is a schematic diagram showing the operation of a system for monitoring the safety of one or more vehicle occupants, such as children, according to some embodiments.

FIG. 2 is a schematic diagram showing the operation of a system 200 for monitoring the safety of one or more vehicle occupants, such as children, according to some embodiments. System 200 may initialize at 205, which may begin with the system 200 in a disabled state or inactive state in some embodiments, as shown at 210.

The system 200 may then proceed to Safety State 1 upon one or more actions and/or conditions. For example, in some embodiments and implementations, a user may manually actuate the system 200 for a particular seat, or for multiple seats. This may be done on a user interface, such as user interface 108. In some cases, system 200 may automatically attempt to detect the presence of a child in one or more of the seats, either following a user actuation of the system in the seat(s) or automatically upon turning the vehicle on, for example. In some cases, the automated detection of children may be performed using in-cabin RADAR that detects various vital signs, such as breathing and/or heart rates, that may be correlated with age.

Safety State 1 may be considered a default and/or normal safety state category. For example, Safety State 1 may be indicative of normal health and/or safety conditions being detected and/or no health and/or safety conditions/data having yet been identified.

In Safety State 1, which may alternatively be referred to as a "Green" safety state herein, system 200 may be configured to operate one or more sensors, as previously described, to attempt to detect behaviors, events, and/or conditions of each of the one or more children/occupants either manually indicated for such detections or automatically determined/detected to be present in the vehicle. If one or more behaviors, events, and/or conditions are detected that are within Safety State 2 (otherwise referred to herein as a "Yellow" safety state), system 200 may be configured to enter Safety State 2, as indicated at 220 in the figure.

Upon entering Safety State 2 (220), one or more notifications and/or actions may be triggered by system 200. For example, in some embodiments and implementations, an icon associated with each child corresponding with the entry into Safety State 2 may be changed. For example, in preferred embodiments and implementations, an icon of a child may change from one color, such as green, to another color, such as yellow, to indicate the entry into an elevated safety state category.

In some cases, one or more additional icons may be displayed and/or changed to indicate the specific condition, event, or behavior detected. For example, if an object is detected as having been dropped, such as a bottle, an icon comprising an image of a spilled cup may be displayed. As another example, if evidence has been detected indicative of a child being in a state of discomfort, an icon of a frowning face may appear, or the original icon of the child may be changed to have a frowning face appear thereon. In some embodiments and implementations, system 200 may provide other notifications, in some cases optionally at the selection of the user, upon entering Safety State 2 (220) and/or upon detecting a more specific condition.

Some embodiments and implementations may further comprise a sleep state 230. If the sensors detect a possible or likely sleeping condition, such as based upon, for example, breathing rates, heart rates, facial features (closed eyes), head position, snoring noises, etc., system 200 may move from any of the various safety states to the Sleep State 230. Entry into the Sleep State 230 may result in a similar change in the user interface and/or display.

For example, some embodiments and implementations may change the icon(s) of the sleeping child/children, such as a change from a color associated with the current safety state category to a color associated with the Sleep State 230. In some cases, going from Safety State 1 (215) to Sleep State 230 may therefore result in an icon changing from green to blue. In some cases, the icon may also, or alternatively, change in other ways, such as changing the face of the icon to a face indicative of sleeping. Alternatively, or additionally, a separate icon may be displayed adjacent to the primary icon to indicate that the child is sleeping, as shown in FIG. 4B, which is discussed in greater detail below.

Upon detecting that the child is no longer asleep, system 200 may be configured to move the child into another safety state. For example, if no other safety conditions, events, and/or features are detected that warrant entry into a heightened safety state category, detection of the child awakening may result in movement from the Sleep State 230 to the default/normal Safety State 1 (215), as indicated in FIG. 2.

An awake signal/alert may be generated, for example, by way of detecting sufficient movement via camera, RADAR, and/or accelerometers. Additionally, or alternatively, a microphone may be used, which may be a vehicle microphone or a dedicated microphone for the occupant seat, to detect noises indicative of awakening.

From any of the various safety state categories, certain events, conditions, and/or behaviors may result in automatic entry into the highest safety state category, which in the case of system 200 comprises Safety State 3 (225). Typically, the events, conditions, and/or behaviors triggering entry into Safety State 3 (225) are those that are considered particularly dangerous and/or that may warrant immediate attention and/or action. In some cases, these conditions may therefore be present by default and not subject to user removal or customization. For example, if the sensor(s) detect a choking condition, a critical/unsafe body/skin temperature, an unsafe body pose/position, or an unsafe seatbelt condition, Safety State 3 (225) may be entered immediately, irrespective of the current safety state of the child.

Entry into Safety State 3 (225), or the highest safety state category, may trigger several actions. For example, the icon associated with the child may change, such as changing color. In preferred embodiments and implementation, this color may be indicative of danger, such as red and/or may be flashing. In some cases, one or more additional icons may be displayed to provide an indication of the specific condition, event, and/or behavior that triggered entry into Safety State 3 (225), such as a secondary icon indicative of choking, as shown in FIG. 4C. Some embodiments and implementations may further be configured to take additional actions upon entry into Safety State 3 (225), such as triggering the display of a live view of the child for the driver and/or other passengers, as shown in FIG. 4D and/or additional notifications, such as audible and/or haptic notifications.

In some embodiments and implementations, some of specific behaviors, events, and/or conditions used to trigger a specific safety state category may be customizable, may be preconfigured, or may comprise a default setting with an option for customization. For example, a user may be able to customize a body/skin temperature range or threshold that will trigger entry into an intermediate safety state category, such as Safety State 2 (220). Similarly, a user may be able to individually enable or disable one or more of a plurality of conditions that will trigger the intermediate safety state category, such as objects in the child's mouth, crying, drop notifications, spill notifications, vomit/spit up notifications, discomfort notifications, and skin temperature notifications. Users may also be able to customize whether to detect and whether to provide notifications for sleeping conditions.

Users may also, in some embodiments and implementations, be able to customize the types of notifications that are provided to a user for each safety state category and/or individual condition detected. For example, in some cases, one or more of the intermediate safety state categories may have notification settings that can be customized by the user into, for example, visual notification only, visual and audio notification, or visual, audio, and haptic notification. Similarly, each individual condition may have a similar notification setting option so that the driver is provided with the level of notification for each event that is deemed to be most safe and/or appropriate both to the child and to the other occupants in the vehicle.

Some embodiments may comprise various other modules, such as functional modules that may be made up of software and/or firmware. For example, a vital sign module may be configured to process incoming data so as to identify a vital sign, such as a breathing rate or heart rate, of an occupant and estimate the rate.

In some embodiments, a classification module may also be provided and/or used with the system to classify each vehicle occupant associated with a particular estimated vital sign. For example, classification modules may be configured with one or more predetermined ranges of breathing rates or other breathing rates based upon statistical data correlating age with such vital sign, whereby each occupant may be classified as an adult or as a child that warrants safety monitoring under the system.

In some embodiments, the classification module may be configured to use a statistical analysis of the incoming vital sign data alone to classify the occupant(s). Alternatively, other parameters and/or features may be used in conjunction with the parameter/feature derived from the statistical analysis to classify occupants, such as data indicative of a size/weight of occupants, which could also be derived from the same RADAR sensor or other electromagnetic radiation data. Alternatively, such data may be obtained from other sensors, such as weight sensors, temperature sensors, cameras, and the like. Thus, it should be understood that the term "sensor," as used most broadly and without additional adjectives herein, should therefore be considered to encompass, such additional or alternative sensors.

Figure 3:
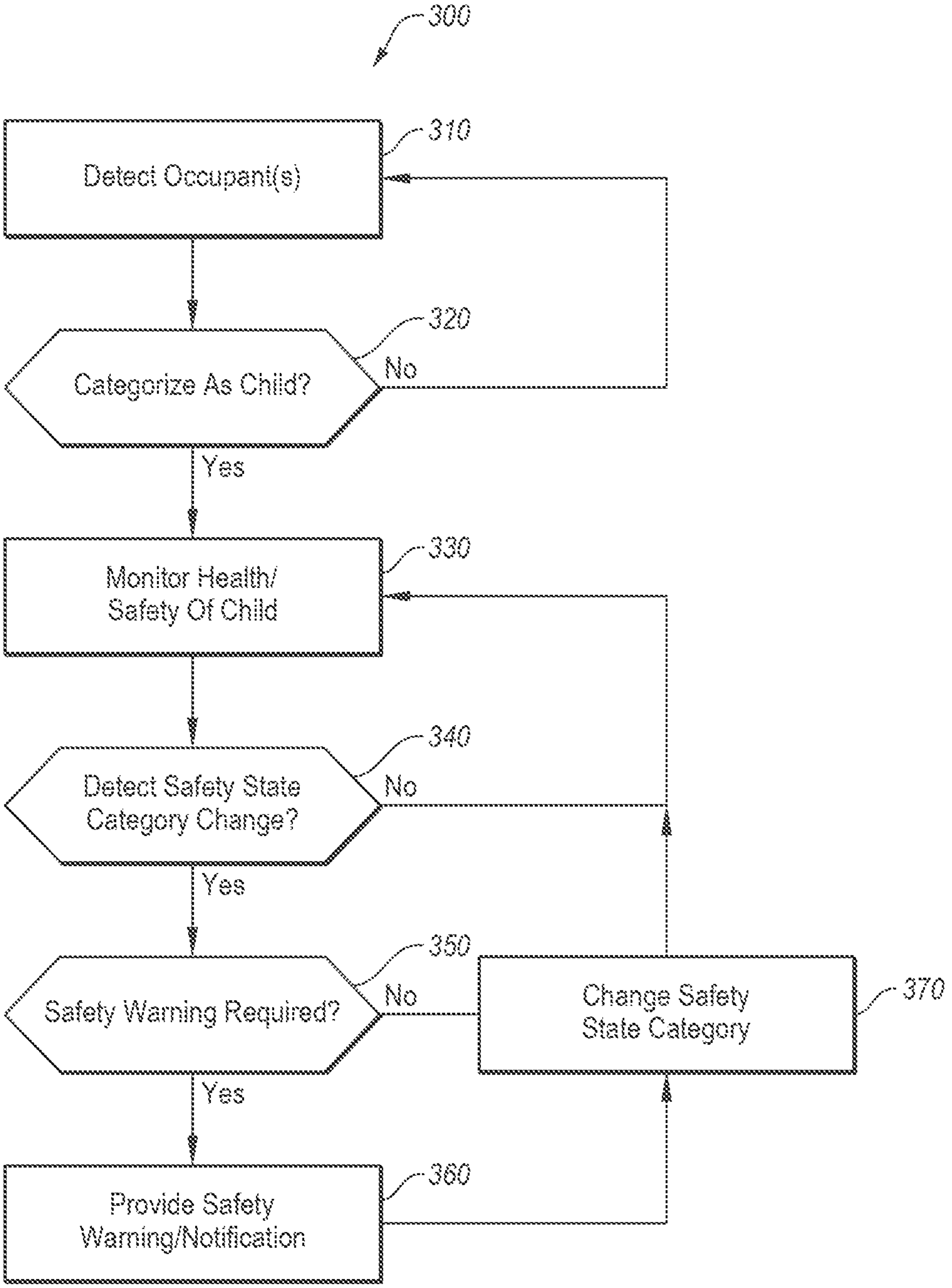
FIG. 3 is a flow chart depicting an example of a method for monitoring the safety of one or more vehicle occupants, such as children, according to some implementations.

FIG. 3 is a flow chart depicting an example of a method 300 for monitoring the safety of one or more vehicle occupants, such as children, according to some implementations. The method 300 may begin at step 310, at which point detection of one or more occupants may take place.

Step 320 may comprise categorizing vehicle occupants as children. In some cases, the system may be configured to automatically attempt to detect the presence of any children in any of the vehicle seats, such as, for example, by way of heart rate, breathing rate, and/or size/weight detections. In some cases, a user may be able to actuate one or more seats known to have children in them during a particular trip, in which case step 320 may comprise receiving input from a user and placing each of the seats selected by the user into the system as a child for automated monitoring.

In some implementations, multiple sensors, RADAR or otherwise, may be used to categorize vehicle occupants. For example, in some cases, a repeating frequency may then be identified by identifying the peaks in a Doppler spectrum associated with one or more range bins and/or data collections. For example, RADAR data may be sorted into bins based upon, for example, range or any other suitable parameter and then the signal or signals with an identifiable repeating peak pattern that is the strongest may be identified and processed.

Such processing may be used to estimate a vital sign. For example, an initial vital sign may be associated with a repeating signal pattern and/or a particular occupant. Then, the distance between adjacent peaks in the pattern, or a statistical analysis of such pattern(s)—such as an interpolation, mean, weighted mean, and/or median, for example, of a distance between adjacent peaks and/or an initial vital sign rate estimate—may be used to determine and/or refine the vital sign estimate. In some implementations, additional processing steps, such as applying smoothing filters of the vital sign estimate, may also take place. Preferably, this vital sign estimate is then processed and refined over time to maintain a real time, or at least substantially real time estimation of the vital sign of one or more occupants in the vehicle.

Once a vital sign estimate has been obtained based on an initial estimate of the repetition frequency, one or more occupants of the vehicle may be classified using, at least in part, the vital sign estimate. For example, in some implementations, vehicle occupants may be classified based upon their predicted age group, which may be based wholly, or at least partially, on the vital sign estimate. This may involve use of vital sign thresholds and/or vital sign ranges. For example, if a detected breathing rate is at least 30 breaths per minute, the associated vehicle occupant may be classified as a child. In some implementations, the classification may require a stable rate detection, such as an estimation within the threshold and/or range over a predetermined period of time, so as to prevent temporary increases in breathing rate or another vital sign from re-classifying an occupant.

As another example of a possible classification based at least partially on a rate associated with a vital sign estimated using RADAR or another electromagnetic wave signal, in some implementations and embodiments, occupants may be classified based upon a detected change in a vital sign. For example, if a breathing rate, heart rate, or another detected vital sign drops by a predetermined amount, such a predetermined percentage or predetermined raw number of breaths/beats per minute in a relatively simple example, the occupant/child may be classified as sleeping or otherwise having a noteworthy condition. This method may therefore be used in connection with other steps in method 300, such as step 340, which is discussed below.

If no occupants have been automatically or manually categorized as a child, method 300 may revert to step 310 for detection of occupants and/or may simply enter an idle state. With respect to any occupants that have been automatically or manually categorized as a child, the method may proceed to step 330 for active monitoring of the child/children and/or seat(s). In some cases, step 330 may comprise actuating one or more sensors, such as RADAR sensors, visual cameras, LIDAR sensors, NIR cameras, seatbelt sensors, audio sensors, and/or the like. Step 330 may also, or alternatively, comprise directing one or more such sensors and/or reconfiguring one or more such sensors towards the child/children/seat(s) in question. For example, one or more sensors may be reoriented and/or otherwise reconfigured to increase the amount and/or location of detection data in particular regions associated with such child/children/seat(s).

A module, such as a safety state categorization module, may use the data collected by the various sensors to attempt to detect a condition, behavior, and/or event that warrants a change in the current safety state category at step 340. As soon as one or more conditions, behaviors, and/or events are detected that are preconfigured to change the current safety state category, method 300 moves to step 350 for determination of whether a particular action, such as a safety warning, is required.

For example, if an emergency condition, such as a choking child, is detected, method 300 may provide a visual, audible, and/or haptic warning at 360. Choking may be detected, for example, based upon the breathing rate of the child, which may be sensed by RADAR sensors in some cases.

In some cases, such warning/notification may include the automated display of a live view of the child on a user interface/display. In some implementations and related embodiments, a secondary icon indicative of the particular issue/condition may be displayed at step 360. Step 360 may further comprise comparing a particular detected condition with a user input relating to the condition and, if a user has elected to receive a particular notification, providing the notification indicated by the user.

Once the warning/notification has been provided at step 360, or if no such warning was needed at step 350, the safety state category may be changed at 370. In some cases, an indication of the safety state category change may be provided to the driver and/or another user/passenger. For example, a primary icon of the child may change. In some cases, this change may be a change in color. Alternatively, or additionally, a change in the icon itself may be provided. For example, if the safety state category changes to a sleeping state, the icon itself may change to one indicative of sleeping. Alternatively, a secondary icon may be displayed, such as below or otherwise adjacent to the primary icon, to provide an indication of the sleeping state of the child.

Following the requisite change(s) to the safety state category of the one or more children being monitored, the method may revert to an earlier step, such as step 330 to continue monitoring the child/children for other events, conditions, and/or behaviors that may warrant additional actions.

FIGS. 4A-4D depict various examples of screenshots of a user interface, such as a human machine interface, that may be used in a vehicle having a safety monitoring system.

Figure 4A:
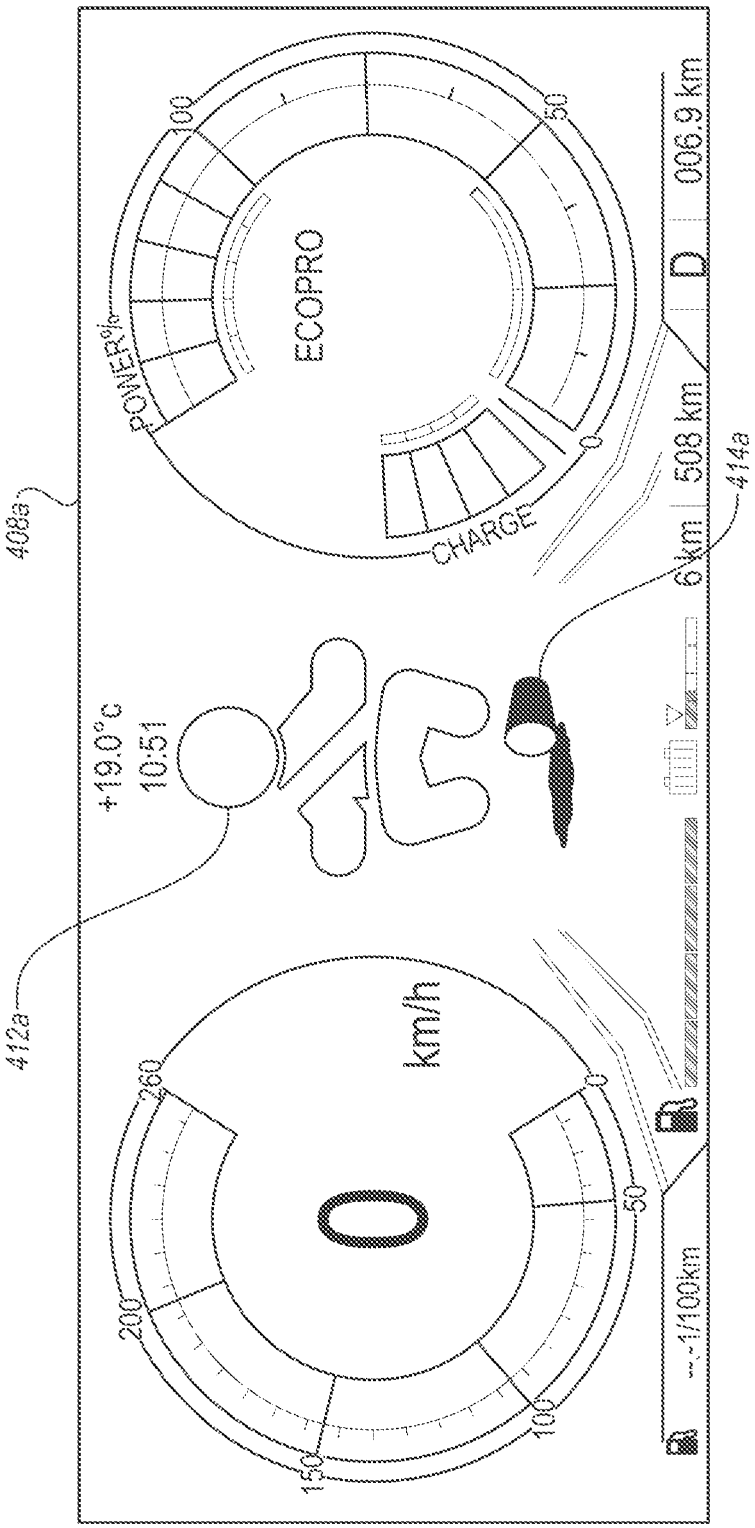
FIGS. 4A-4D depict various examples of screenshots of a user interface, such as a human machine interface, that may be used in a vehicle having a safety monitoring system.
Figure 4B:
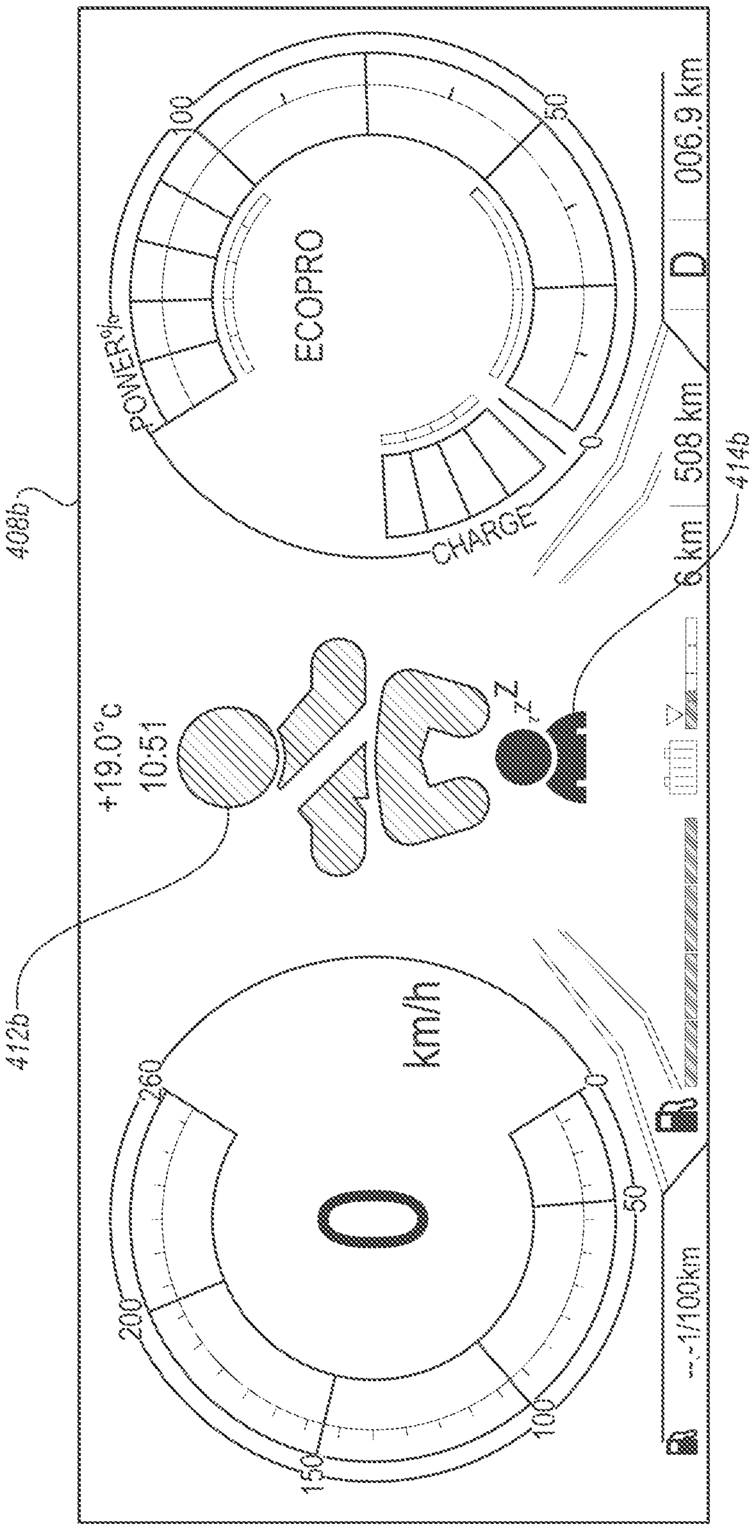
Figure 4C:
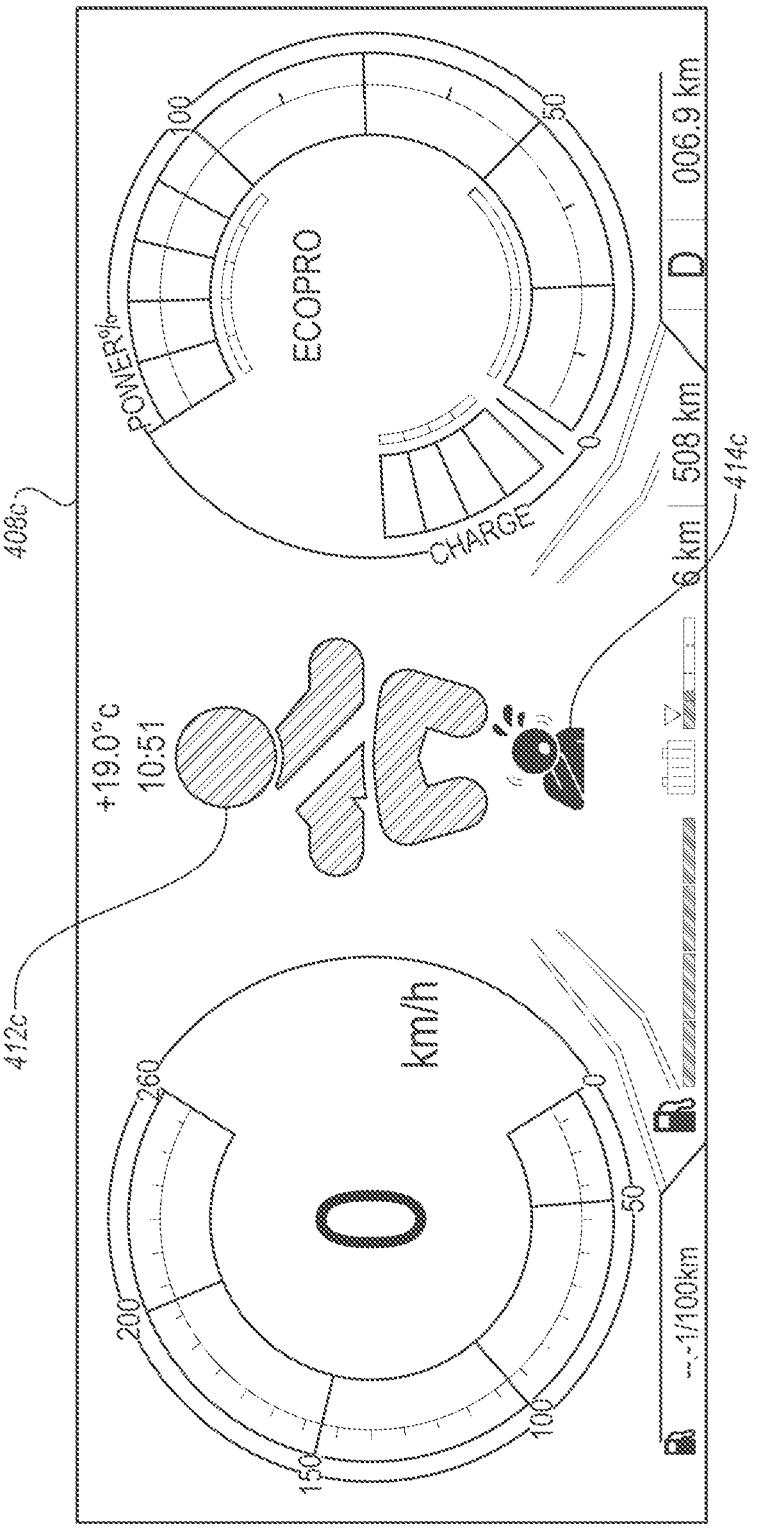
Figure 4D:
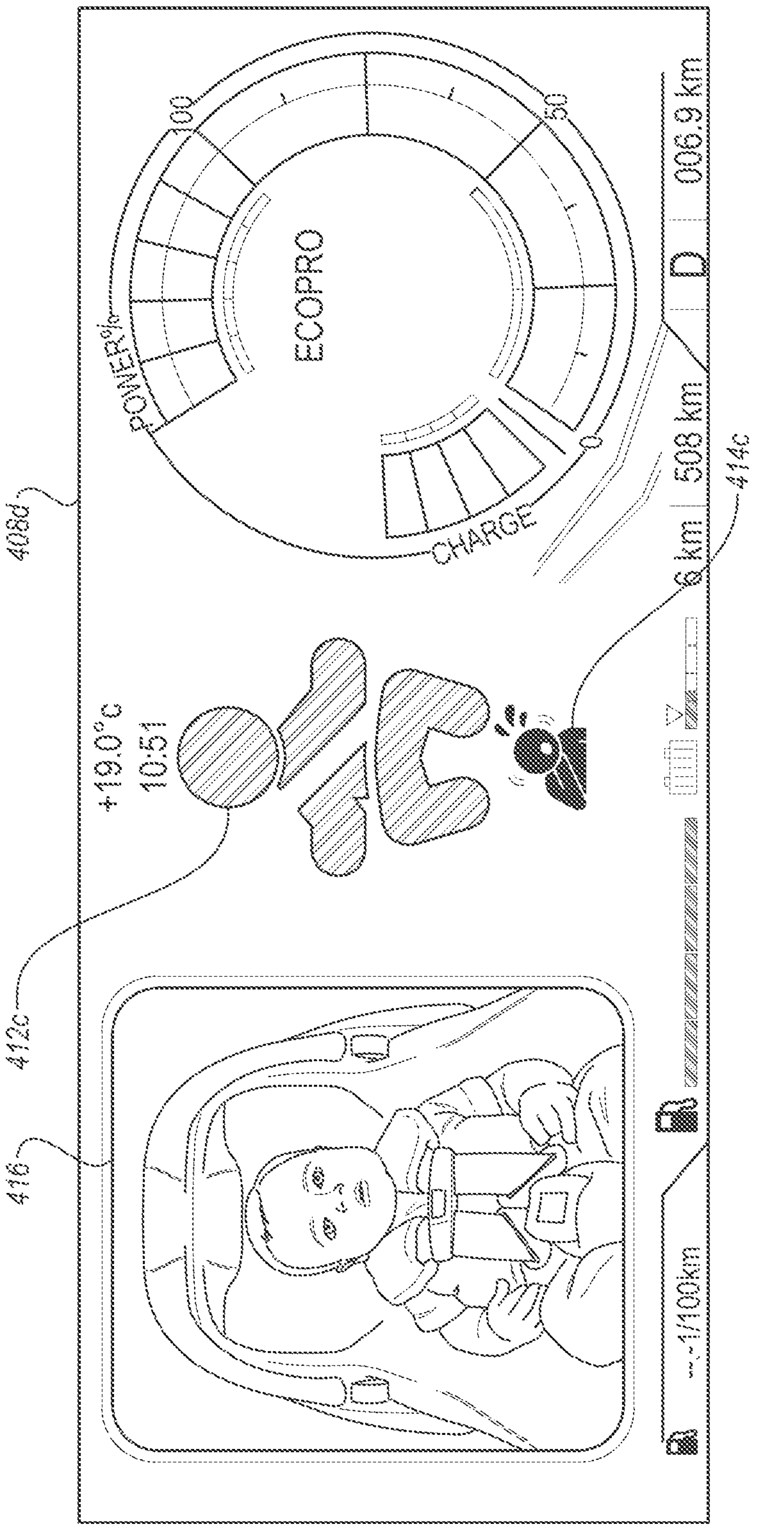

FIG. 4A depicts a user interface **408*a* that may be used as part of a typical dashboard display, and may therefore include, for example, a speedometer, tachometer, distance display, fuel/charge readings, and the like. However, it should also be understood that other embodiments are contemplated in which one or more of the features of the user interface 408*a*** that are part of a child safety monitoring system may be part of a separate display, such as a disassociated display screen, an instrument panel screen, or a separate display screen devoted exclusively to a child monitoring system. Because the elements of the user interface that are associated with child safety monitoring are of primary importance, they will be the focus of the description herein.

A primary icon **412*a* is shown on display screen/user interface 408*a*. Icon 412*a* may be representative of a child in the vehicle that is currently being monitored. Icon 412*a*** may be configured to display in a plurality of distinct colors. For example, in preferred embodiments and implementations, a green icon may be used to indicate that no safety concerns for the child being monitored have been detected. A yellow icon may be used to indicate a current safety state of the child being monitored that may be of concern and/or interest to the driver and/or other occupants but does not require immediate attention or action. A red icon may be used to indicate an urgent or highest level/concern status. In other words, red may be used to indicate a current safety state of the child requiring immediate attention. In some embodiments, a blue icon may also be used, which may be indicative of a sleeping state of the child.

Of course, a wide variety of alternatives are contemplated. For example, other colors may be used, as desired, to indicate various safety state categories, and the preferred colors indicated above may be changed in various embodiments as desired. Similarly, although an icon representing a child in a car seat, as shown in FIG. 4A, may be preferred, other icons may be used to represent each child being monitored. In addition, other colors/categories may be used. For example, another color, such as gray, may be used to indicate the presence of a vehicle occupant that is not currently being monitored, which may be due to, for example, the occupant's age or a decision by a user of the system to disable monitoring in a particular seat. Further, some embodiments may be configured to provide safety state category information to a user in other ways, such as by flashing in some categories (most likely for the most urgent safety state category), by changing the icon itself, either instead of or in addition to changing the color of the icon.

The user interface of FIG. 4A further comprises a secondary icon 414*a*, which is presented adjacent to the primary icon 412*a*. Secondary icons may be used to provide additional information about a specific safety condition, behavior, and/or event detected of the child. In other words, in some embodiments and implementations, primary icons, such as icon 412*a*, may be used to provide information, such as by way of the color of the icon, as previously explained, about a particular safety state category representative of a plurality of individual conditions, behaviors, and/or events. By contrast, secondary icons, such as icon 414*a*, may provide information, such as by way of the image of the icon and/or its color, for example, about a specific condition, behavior, and/or event associated with the child represented by the primary icon.

Preferably, the secondary icon 414*a* is located adjacent to and/or in close proximity to the primary icon 412*a*. This may be particularly important for embodiments and implementations in which multiple primary icons are included on the display/user interface, each of which represents a different child occupant of the vehicle, as discussed in greater detail below.

In the example of FIG. 4A, the secondary icon 414*a* is an image of a spilled cup. The presence of this particular, secondary icon 414*a* may therefore be triggered by the detection of a child dropping, releasing, and/or otherwise experiencing a removal of an item that had previously been held or otherwise maintained in close proximity to the child, such as when a child drops a bottle or toy, or when the child spits out a pacifier, for example.

FIG. 4B is another screenshot 408*b* from the same user interface. In this example, the primary icon 412*b* has changed colors, in this case to indicate the detection of the child having fallen asleep. The driver or other adult occupant(s) using the user interface can tell that this has happened due to the change in color (the new color may be blue, for example) and/or by the presence of a new secondary icon 414*b* which is indicative of sleep.

FIG. 4C is yet another screenshot 408*c* from the same user interface. Again, in this example, the primary icon 412*b* has changed colors, in this case to indicate the fact that the child being monitored has had a condition, behavior, and/or event detected by the system that places the child in the highest/most urgent safety state category. As previously mentioned, in some embodiments and implementations, this may mean that the primary icon 412*b* is now displayed in red. In some cases, the primary icon 412*b* may also flash or pulse to highlight the need for attention/action.

In addition, the secondary icon 414*c* has changed. In this example, the change indicates the detection of possible choking by the child. In some embodiments and implementations, any detection that places the child in the highest/most urgent safety state category may also trigger the actuation of a live video camera feed directed at the seat associated with the child at issue, as shown in FIG. 4D at 416.

Figure 5:
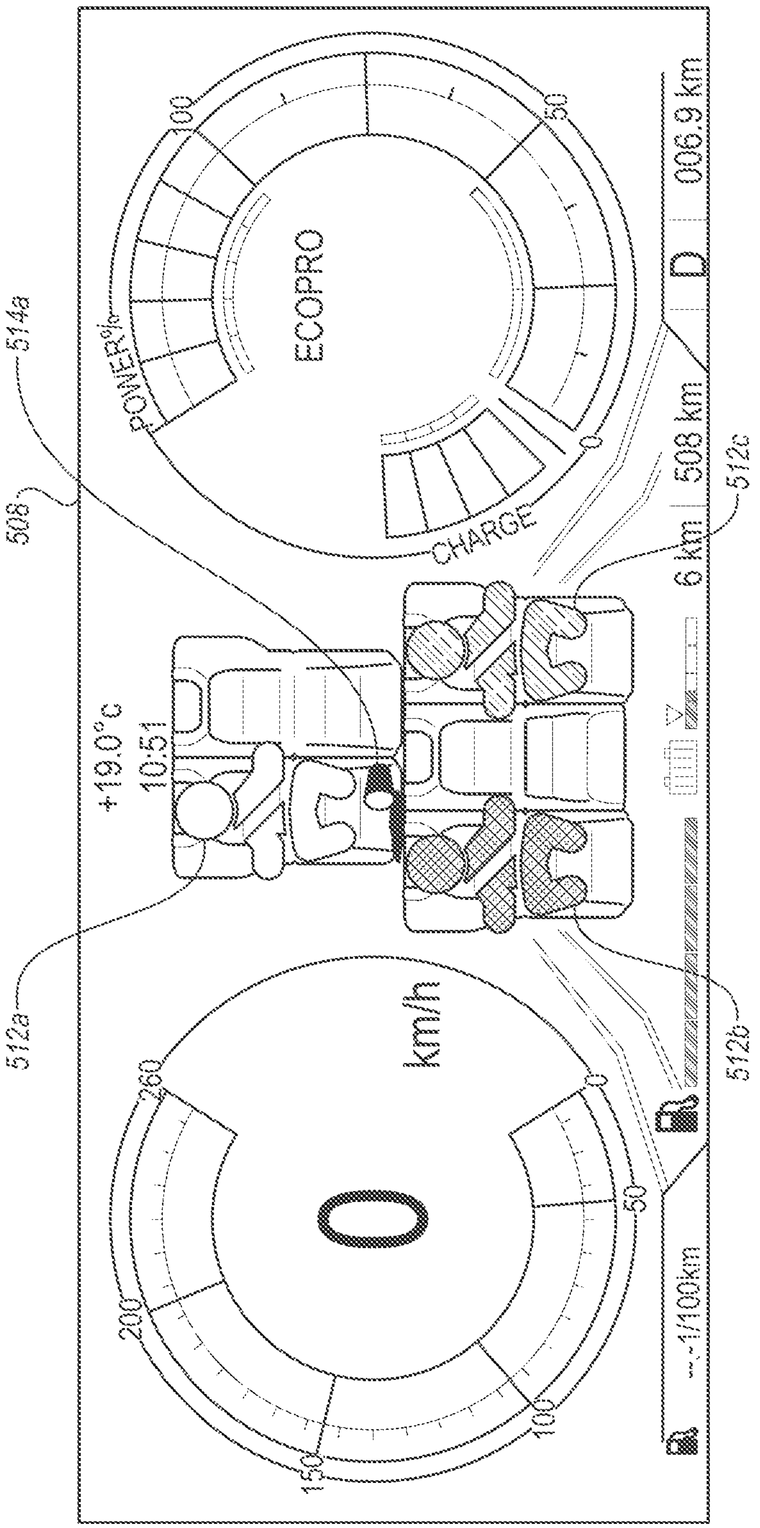
FIG. 5 depicts another example of a screenshot of a user interface, such as a human machine interface, that may be used in a vehicle having a safety monitoring system.

Some embodiments and implementations may allow for the monitoring of multiple children at the same time and may have the ability to display information and receive input relating to the plurality of children being monitored. FIG. 5 provides an exemplary screenshot 508 of a user interface of such a system. As shown in this figure, three primary icons are presented on the display screen, namely primary icons 512*a*, 512*b*, and 512*c*.

In the example of FIG. 5, each of the primary icons 512*a*/512*b*/512*c* is a different color. As previously explained, this indicates that each of the three occupants/children is in a different safety state category. For example, the child associated with primary icon 512*a* may be in an intermediate or yellow safety state category, which in the example may have been triggered by various conditions of intermediate concern, such as a drop and/or spill, which is indicated by the presence of secondary icon 514*a*.

Primary icon 512*b* may indicate that the corresponding child is in the default or normal safety state category, which may be indicated by the color green in some embodiments. Finally, primary icon 512*c* may indicate that the occupant in this seat is not being monitored. This icon 512*c* may have been triggered, for example, by a user disabling monitoring for this particular seat or due to the system automatically sensing that the occupant in this seat is an adult rather than a child. In some alternative embodiments and implementations, however, the icon associated with this category may be changed to an icon more closely resembling an adult relative to the active, child monitoring icons.

As previously mentioned, the monitoring system associated with the exemplary user interface screenshots of FIGS. 4A-4D and FIG. 5 may allow a driver of the vehicle to manually select one or more seats within the vehicle for child monitoring. Alternatively, the system may be automatically configured, or configured to accept a manual selection from a user to, automatically detect the presence of children within each seat, or at least a subset of the seats, within the vehicle, for automated safety monitoring.

In some embodiments and implementations, a user/driver may also, or alternatively, be able to customize other features of the system, such as which of a set of possible conditions for detection are to be targeted for detection and/or which of a set of possible conditions for detection are to correspond with a particular safety state category. In some configurations, however, it may be desirable to limit the ability for such customization to one or more intermediate safety state categories. In other words, the system may be configured to automatically detect a series of conditions known to be particularly dangerous without regard to customization, such as choking, particular thresholds and/or ranges of high and/or low body temperatures, abnormal breathing, and the like.

Other conditions that a driver/user may or may not wish to be notified of, however, such as crying, discomfort, vomiting, spilling, dropping/losing objects, and/or body temperatures that are outside of ideal ranges but not considered extreme, may be left to the user to target for alerts/notifications or ignore. In some cases, each of these conditions may therefore be individually enabled or disabled by the user. Similarly, certain categories, such as a sleeping category, may be enabled or disabled for notifications.

Some other features, such as automated warnings, notifications, and/or displaying a real-time video image of the child in response to entering an urgent safety state category, may be less open to or entirely removed from such customization abilities.

Figure 6:
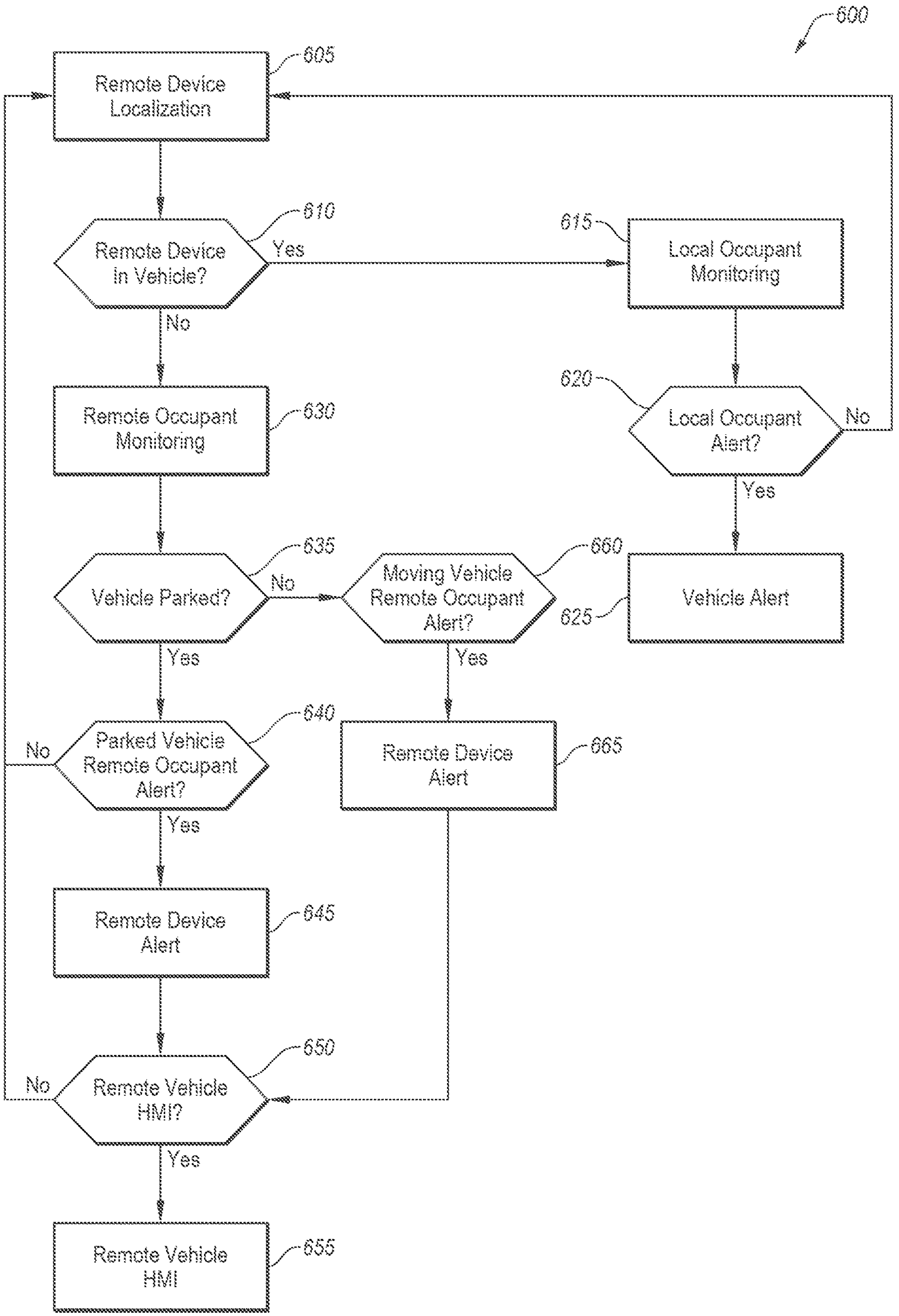
FIG. 6 is a flow chart depicting an example of a method for remote monitoring of the safety of one or more vehicle occupants, such as children, according to some implementations.

FIG. 6 depicts a method 600 for remotely monitoring one or more vehicle occupants, such as children, within a vehicle according to some implementations. Method 600 begins at step 605 with a remote device determining its location relative to a vehicle that may be carrying one or more occupants to be monitored. The remote device may, for example, comprise a smartphone, tablet, desktop or laptop computer, personal digital assistant, or any other computing device, wherein the computing device may include one or more in-built or externally coupled accessories including, but not limited to, a visual aid device such as camera, audio aid, a microphone, a keyboard, a GPS sensor, input devices for receiving input from a user such as touch pad, touch enabled screen, electronic pen, receiving devices for receiving any audio or visual signal in any range of frequencies and transmitting devices that can transmit any audio or visual signal in any range of frequencies.

In some implementations, step 605 may comprise determining a location of the remote device, either generally or with respect to the vehicle. This step may, in some implementations, therefore comprise use of a GPS sensor within the remote device. However, other embodiments and/or implementations are contemplated in which a GPS sensor need not be used. For example, other wireless technology, such as cellular, satellite, or a short-range wireless communication protocol, such as Bluetooth®, ultra-wide band ("UWB"), Zigbee®, and or any other suitable communication protocol(s), may be used. In such cases, an attempt may be made to communicate with the vehicle using the wireless communication protocol, which, if successful, may indicate that the remote device is in or within a short distance of the vehicle.

In some implementations, a vehicle may seek, either at step 605 or another suitable step in the process 600, to detect whether a remote device, such as a remote device running a companion application, is paired/coupled with the vehicle. In some cases, the vehicle may first seek the detection of multiple occupants in the vehicle along with detecting whether a remote device is paired with the vehicle. Upon detecting certain conditions, the vehicle human machine interface or other user interface may issue a prompt to the driver, such as on display 108 (see FIG. 1), to install the application on their smartphone or another electronic device. This prompt may provide a link, which may be displayed for the driver and/or sent to an email address, such as one pre-registered on the system or one entered following the prompt, for downloading the application. For example, upon detecting that a remote device is not and/or has not been paired and/or enrolled with the vehicle, in some cases along with the presence of multiple occupants in the vehicle, the prompt may be issued.

In some cases, when certain conditions are met, a remote device may be configured to suggest downloading and/or enabling a remote monitoring feature. For example, when a person exits the vehicle, when doors are opened and/or closed, when a remote device leaves a predetermined range/distance from the vehicle, and/or when children are detected in the vehicle, the remote device may be issued a notification suggesting that the remote monitoring be enabled and/or an application and/or module for remote monitoring downloaded. In some cases, the vehicle may issue an alarm that requires such enabling and/or downloading to turn off and/or avoid.

Method 600 may then proceed to step 610 at which point data collected from step 605 may be used to determine whether the remote device is within, or within a predetermined and/or relatively short distance of, the vehicle. In some cases, step 610 may comprise communicating with, or attempting to communicate with, an electronic device and/or system of the vehicle. For example, the strength of a wireless signal from the remote device may, for example, be used to determine the distance of the remote device from the vehicle and may thereby be used to determine whether the remote device is within, or within a sufficiently short distance of, the vehicle.

If it is determined that the remote device is within, or within a sufficiently small distance of (in some cases, a predetermined threshold distance) the vehicle, method 600 may proceed to step 615. Step 615 may, in some implementations, comprise proceeding to a local occupant monitoring mode of the system. Thus, for example, in some implementations, step 615 may comprise proceeding to a functional mode equivalent or similar to those previously discussed, such as system 200 and/or method 300. This may, for example, therefore entail disabling all or some of the features of the remote monitoring aspects of the method/system discussed below in favor of the local occupant monitoring features previously discussed.

However, in other implementations, one or more (in some cases, all) of the features/aspects of the remote monitoring system/method may still be enabled. For example, in some implementations, a user of the remote monitoring system may still receive notifications and/or video feeds on the remote device, even while being in the vehicle. However, in preferred embodiments and implementations, certain features that may be particularly useful for remote monitoring may be disabled following a determination that the remote device is being used within the vehicle.

For example, if it is determined at step 610 that the remote device is within the vehicle, the local occupant monitoring of step 615 may comprise disabling of remote communication features, since the user can simply communicate with the children/occupants directly without use of the remote device. As previously mentioned, however, local occupant monitoring 615 may still, in some cases, provide notifications and/or alerts for certain conditions. Such notifications/alerts may also still be provided on a screen/user interface of the vehicle along with the remote device, if desired.

In some cases, as part of an initial sequence of local occupant monitoring, such as during step 615, the vehicle may seek to detect the presence of any occupants within the vehicle below a predetermined age. In some cases, a user may manually enter the age of one or more of the occupants or the vehicle may use data from sensors in the vehicle, such as RADAR sensors, to detect the ages of the occupants using, for example, vital sign data as disclosed elsewhere herein. If any occupants meeting this age threshold are detected and/or entered, the vehicle HMI/user interface may also, in some cases, advise the driver that alerts and/or alarms will be activated if these children are left alone in the vehicle, in some cases beyond a time threshold. Similarly, remote alerts may be sent to a remote device in the event that this occurs, such as during any of the remote device alert steps shown in FIG. 6.

Once the system is within the local occupant monitoring mode, a determination may be made at step 620 as to whether to issue a local occupant alert. Step 620 may, for example, comprise monitoring one or more of the occupants for conditions predetermined, or selectively determined by a user, to be most useful and/or relevant to circumstances in which the remote device user/caregiver is within the vehicle. Because the user/caregiver is within the vehicle, in some cases, the method may comprise allowing the user/caregiver to manually select one or more seats within the vehicle for monitoring. This may be done on the remote device or on a user interface of the vehicle itself.

In some cases, step 620 may comprise assessing a subset of the conditions previously mentioned that are more likely to be useful when the user/caregiver is known to be present in the vehicle and/or conditions that are considered so urgent that whether the user/caregiver is present is not considered important. For example, step 620 may comprise using one or more vehicle sensors, such as temperature sensors, carbon dioxide sensors, accelerometers, RADAR sensors, LIDAR sensors, cameras, ToF sensors/cameras, or any of the other sensors mentioned herein and/or available to those of ordinary skill in the art, to attempt to detect conditions that are most relevant to a remote device user/caregiver that is known to be present in the vehicle with the occupant(s) being monitored. Again, this determination may be made manually by the user, may be automated, or may comprise some conditions that are selected by the user and some that are selected, or deselected, by default.

For example, in some implementations, conditions such as unsafe body temperatures, choking, unsafe seatbelt conditions, unsafe body pose/conditions, breathing and/or heartrates that are outside of a predetermined, expected range, and the like, may be monitored using any of the aforementioned sensors in the vehicle. Upon detecting any of these conditions, step 620 may then move to step 625, at which point an alert may be issued.

In addition to, or as an alternative to, providing an alert indicative of a particular condition of the occupant(s), in some case an alert may be provided that is indicative of a change from one category, such as any of the safety state categories previously mentioned, to another category.

In some implementations, the alert issued at step 620 may also be issued within the vehicle, such as on an in-vehicle display, as previously discussed. Alternatively, this alert may only be issued to the user, or multiple users, of the remote device. In some cases, a remote device user and/or other user of the system, such as the driver, may select whether to issue alerts to the remote device, the vehicle, or both in this situation. These alerts may comprise, for example, any of the types of alerts previously mentioned, such as any suitable visible, audible, and/or haptic alert.

If no condition is detected warranting an alert at step 620, method 600 may revert to step 605, or another step in the process. This may take place, for example, after a predetermined time period during which no alert conditions have been detected. Alternatively, or additionally, this may take place if the vehicle has stopped for a sufficient time, vehicle doors have been opened, the vehicle has been turned off, and/or one or more occupants of the vehicle have been detected as leaving the vehicle and/or their seats within the vehicle.

In some implementations, the remote device may be "localized"—i.e., determined whether to be present in the vehicle, on a repeating, periodic basis. The system/method may also be configured to allow the remote device user to manually select either a local occupant monitoring mode or a remote occupant monitoring mode, if desired.

If at any point the remote device is determined to be outside of the vehicle at step 610 (i.e., remote device in vehicle? NO), method 600 moves to step 630 for remote occupant monitoring. In some cases, this step may comprise enabling one or more sensors and/or condition detecting features not included with the local occupant monitoring mode, such as features allowing for remote communication between vehicle occupants and the remote user(s) (microphones, speakers, etc.), video feeds of the occupant(s) being monitored, ambient air temperature monitoring, outside temperature monitoring, ability to control air conditioning, heating, windows, locks, etc., location and/or vehicle condition notifications, and the like.

Occupant monitoring, whether local or remote, may be triggered in a variety of ways. For example, remote monitoring may be automatically entered upon detecting that the remote device is outside of, or a predetermined distance from, the vehicle. As another example, remote monitoring may be triggered simultaneously with local monitoring, such as upon detecting the presence of occupants, or occupants meeting certain criteria, such as ages or approximate ages, within relevant seats.

Remote occupant monitoring may, in some cases, activate an additional alert feature in some cases (although in other cases this may be activated during local monitoring as well) that triggers an alert upon detecting an occupant speaking a key word or phrase, such as, for example, "HELP," "WHERE ARE YOU?," "MOMMY," "DADDY," etc. Such key words/phrases may be detected via camera and/or microphone, for example. In addition, as previously mentioned, separate, dedicated microphones may be used for each occupant, a single microphone may be used for the entire vehicle, or a microphone may be used for each row, for example.

In some cases, after entering the remote occupant monitoring mode at 630, a determination may be made as to whether the vehicle is parked at 635. This determination may be made, for example, by determining a current location of the vehicle, how long the vehicle has been stopped, whether vehicle doors have opened, whether the driver or other occupants of the vehicle have exited the vehicle, etc. If the vehicle is determined to be parked at 635, method 600 may proceed to step 640. In some cases, method 600 may also determine whether the parked vehicle contains any occupants needing to be monitored. If no such occupants are detected, the method 600 may revert to another step, such as step 605, until an occupant returns to the parked vehicle.

Step 640 may begin with entry into a mode or sub-mode of the system/method unique to parked vehicles, or in some cases parked vehicles known to have occupants left inside, as previously mentioned. This mode may then result in attempting to detect conditions within the parked vehicle that warrant an alert. For example, ambient air temperature sensing may be actuated, along with or as an alternative to child waking, choking, objects in mouth, vomit/spit-up, crying, skin temperature, heartrate, and breathing rate detection. Live audio and/or video feeds may also be automatically activated upon determining that a vehicle has been parked and/or a child/occupant left in the vehicle. This may allow a driver to then become the remote device user to feel more comfortable leaving a child in the vehicle while running an errand, for example.

As previously mentioned, various conditions may be detected using one or more, including a desired combination, of any of the aforementioned sensors. For example, objects in the mouth may be detected via camera, crying may be detected using a camera and/or microphone, object drops and/or spills may be detected via camera, vomit/spitting up may be detected via camera and/or microphone, discomfort may be detected via camera, microphone, and/or RADAR (using facial expressions, for example), heart and/or breathing rates may be detected via RADAR, and age may be detected via camera and/or RADAR.

Some features may be enabled or disabled depending upon the status of the vehicle and/or driver. For example, if the vehicle is not an autonomous vehicle, it may be configured to identify whether the driver is present and/or whether the vehicle is parked and, upon detecting the lack of a driver and/or that the vehicle is currently parked, certain detection modules and/or features may be temporarily disabled. For example, if the vehicle is parked and the driver exits the vehicle, the system may be configured to disable seatbelt sensor notifications until the driver returns and/or the vehicle resumes movement.

Of course, any of these steps may be automated or may be manually actuated by a user/driver. For example, in some cases, a user may manually enter a parked vehicle mode upon parking the vehicle to allow for more intensive monitoring of a child within the vehicle while the driver/parent/caregiver is away. Like an automated entry into a parked mode, this may result in the activation, or deactivation, of one or more particular monitoring features, sensors, and/or modules.

If any conditions are detected that are worthy of an alert (either manually selected as such or selected as such by default) are detected, a remote device alert is issued at step 645. Such alerts may be visual, audible, and/or haptic. In some cases, the alert may comprise a notification of the particular condition detected and/or a category change triggered by the condition. In some cases, a live video and/or audio feed of the occupant(s) may be automatically transmitted to the remote device as, or as part of, the alert.

In some embodiments and implementations, the system may be configured to categorize one or more of the conditions being detected (in some cases, all of the conditions) and assign each such condition (or a category of related conditions) a particular notification feature, such as a color of an icon or another portion of a visual notification, a particular sound/sound clip, or a haptic vibration pattern. For example, in some cases, a red colored icon and/or alert portion, such as a border, outline, or overlay, may be assigned to the most urgent category of conditions, such as the highest safety state category mentioned above. Thus, any conditions within this category and/or a transition into this category may carry an alert with a visual red icon or red feature.

When a border, outline, or overlay is used along with a live feed, still image, or other image (such as an icon) of the occupant, in some cases, these elements may be applied specifically to a region of the occupant relevant to the alert. Any of the icons associated with a particular safety state category previously mentioned in connection with the display within the vehicle may also be displayed on the remote device, if desired.

As another example, in some cases, a particular sound and/or sound clip may be associated with a particular condition, set of conditions, and/or category/state. For example, if an unsafe ambient temperature is detected, the remote device may automatically play an audible sound with a voice indicating "UNSAFE TEMPERATURE DETECTED." However, the sound need not include audible text. Thus, as another example, if a condition of waking up is detected, an alert may be sent to the remote device including a rooster sound, an escalating scale, or the like.

As yet another example, in some cases, a particular haptic pattern may be associated with a particular condition, subset of conditions, and/or category/state. For example, the remote device may be configured to vibrate repeatedly with a spacing pattern indicative of the seriousness of the condition, such as spacing apart the vibrations with the spacing corresponding to the urgency of the condition, such that pulses of vibrations with little time/spacing in between are considered more urgent and those with larger spaces in between indicative of non-serious or less serious conditions.

In some embodiments and implementations, a user may be able to selectively program/categorize one or more of these features. For example, a user may be able to associate colors with conditions, sets of conditions, and/or categories/states, may be able to associate certain sounds with certain conditions, sets of conditions, and/or categories/states, and/or may be able to associate certain vibrational patterns with certain conditions, sets of conditions, and/or categories/states. In some cases, a user may be able to record his or her voice and replay this sound in connection with certain conditions, sets of conditions, and/or categories/states. For example, a user may record his or her voice saying, "BILLY IS AWAKE" and link it with a condition under which the occupant is detected as having woken up. Similarly, a user may record his or her voice saying, "TIME TO GET BACK TO THE CAR," and link it with a set of conditions that warrant attention but not deemed to be immediately life threatening to the occupant.

In some cases, a user may be able to categorize one or more conditions and/or categories and assign each such condition and/or category with a particular color, icon, sound clip, and/or haptic vibration pattern. This may be configurable on the remote device itself, such as on software (an application, for example) on the remote device and/or within the vehicle itself.

Because some conditions may be more urgent for certain ages and/or occupants having certain health conditions, and because of emerging regional legal frameworks, such as regulations, regarding leaving children below a certain age alone in a vehicle unsupervised, in some cases, the system/method may automatically detect the age or approximate age and/or certain health condition of one or more of the occupants to facilitate desired categorization. In some cases, the system/method may also allow users to manually input the age and/or relevant health conditions of the occupants.

For example, in some embodiments and implementations, an occupant having a heart condition may be detected via RADAR sensing and/or may be manually entered by a user. This occupant's heart rate may then be monitored more closely (such as using a dedicated sensor, for example) and/or using a different range, for example, to attempt to detect a heartrate that would be indicative of an unsafe health condition that may not be considered unsafe for a typical occupant.

Assuming the application/remote device is used in a region with regulations and/or laws that prohibit leaving a child under a certain age in a vehicle unsupervised for a certain amount of time, such as 10 minutes, some embodiments may fully or partially satisfy the requirement to supervise the child in the vehicle. For example, in some legal frameworks, a remote monitoring system as described herein may be viewed as an appropriate and satisfactory substitute for directly supervising the child. Similarly, viewing a live camera view of the child may, under some circumstances, substitute for supervising the child. As such, additional or alternative alerts may be provided based on the location of the vehicle and/or remote device. Some embodiments may therefore be configured to use GPS sensors in the vehicle and/or on the remote device and may alter one or more functions of the system depending on the laws or regulations currently applicable.

Some embodiments and implementations may additionally, or alternatively, track a current distance the remote device is from the vehicle and/or a time that the remote device exceeds a threshold distance from the vehicle. If/when the remote device has exceeded a distance threshold and/or time threshold, the app may provide an alert based on the regional regulations/laws. For example, if the vehicle has determined that a child below an age threshold is alone in the vehicle and the remote device has exceeded a distance threshold, the app may provide a haptic alert along with a visual and/or verbal alert that says, for example "Local regulations require you to supervise the child in your vehicle within 10 minutes if you travel further away from your vehicle." There may be additional alerts at time thresholds that the remote device exceeds a distance threshold. For example, in some cases, alerts may be generated periodically to provide a reminder of how long the child has been unsupervised, such as "Your child has been unsupervised for X minutes."

If an applicable law or regulation requires a guardian to view a remote live camera view of the child within a time threshold, the alert timer may be reset whenever the caregiver views the live camera view on the app. Similarly, if the law/regulation requires the caregiver to supervise the child within a distance threshold of the vehicle, the app may require the remote device to be within a distance threshold before the alert timer can be reset.

There are also various ways in which the interface between local laws/regulations and the operation of the remote monitoring system may be approached. For example, some embodiments and/or implementations may be configured to implement and consider the system as satisfying local regulations for supervision upon use and/or enablement of certain features (such as remote control of locks and/or HVAC, for example).

Similarly, some embodiments and/or implementations may be configured to implement remote monitoring for a stationary vehicle only for a particular time period, which may depend on local laws/regulation, such as only for the first 10 minutes following departure of the driver and/or other guardians from the vehicle. After this threshold time period, the system may be configured to issue alerts to attempt to avoid having the system used for remote monitoring beyond the threshold time.

As another example, some embodiments may be configured to allow remote monitoring for a stationary vehicle only be allowed in certain locations. For example, remote monitoring may be precluded when the vehicle is outside and/or outside of a predetermined temperature range, such as at the grocery store in temperatures above 90 degrees F. Similarly, remote monitoring may be allowed within parking garages and/or within the garage of a private residence.

Following step 645, method 600 may proceed to step 650, at which point a determination may be made as to whether to use the vehicle's user interface, such as a human machine interface (HMI). In some cases, the user of the remote device may be prompted to elect whether to use the vehicle's onboard HMI or other user interface. This prompt may, for example, be part of the alert/notification itself. Alternatively, the system/method may be configured to automatically use the onboard HMI/user interface or allow the user to preselect/configure whether to automatically use the onboard HMI/user interface, such as preconfiguring automated use of the onboard HMI/user interface only in connection with certain conditions, sets of conditions, and/or categories/states.

For example, in some cases, upon opening an application on the remote device, a user may be prompted, or may be able to otherwise elect, to use the remote device to interact with vehicle occupants using the vehicle's onboard HMI/user interface. This may consist of using microphones, speakers, and/or a display/screen to allow the user to communicate with and/or see the occupant(s) using the app on a smartphone or other remote device. Alternatively, or additionally, this option may be triggered, either automatically or by way of a prompt, upon receipt of a particular alert or class/set of alerts. For example, upon receiving a notification that a child has woken up, the remote device/app may automatically access the vehicle's microphone, speakers, and/or display screen to allow for viewing and/or communicating with the child, as indicated at step 655.

In some cases, a user of the remote device may also be able to access and/or control other vehicle components and/or functions, such as the entertainment system, windows, locks, heating, and/or air conditioning, for example. In some cases, one or more users may be allowed to set and/or control the temperature in the vehicle via the remote device at step 655.

If there is no need for accessing the remote vehicle's HMI or other interface/sensors, method 600 may move from step 650 to step 605, or to another step in the process. This may happen, for example, if a user declines a prompt to access the HMI or if the system determines-based upon default settings or, in some cases, user-selected options—that accessing the remote vehicle's HMI is not warranted in connection with a particular condition having been detected.

Returning to step 635, if a determination has been made that the vehicle has not been and/or is not parked, method 600 may proceed to step 660. This transition may, in some cases, correspond with a movement to another functional mode or sub-mode associated with a moving vehicle. Thus, in some cases, instead of rejecting the detection of a parked vehicle, this mode may be entered and/or maintained upon detecting movement of the vehicle.

Once in this mode/state, the vehicle occupant(s) may again be monitored to detect one or more of a series of conditions, which may include any of the conditions previously mentioned. In some cases, this mode may differ from one or more of the other modes in one or more ways. For example, if the vehicle is moving or in a non-parked state (preferably, periods of non-movement may be expected and accounted for based upon stopping at stoplights and the like without triggering a transition to a parked state), additional sensors and/or conditions may be used/sought, or in some cases not used/sought.

For example, in a moving vehicle, a user of the remote device may wish to receive information, in some cases including alerts, regarding the vehicle's speed, direction, and/or location. Thus, for example, if a vehicle exceeds the speed limit by a certain amount, an alert may be generated and sent to the remote device at 665. Similarly, in the event that a collision has been detected, which may be detected, for example, by accelerometers, detection of airbags deploying, etc., an alert may be sent to the remote device. Of course, any of the previous conditions mentioned above may also generate alerts that may be sent to the remote device in any desired manner, including any of the features, customized or not, mentioned herein.

Like the parked vehicle alert at 645, the remote device alert for a moving vehicle at 665 may generate or allow for determination as to whether to use the vehicle's user interface, such as a human machine interface (HMI). Thus, step 665 may proceed to step 650 for this determination, possibly resulting in accessing the vehicle's user interface and/or communication features to allow the remote user to view and/or interact with vehicle occupants. Again, this may result in accessing, either automatically or receiving a prompt for accessing, the remote vehicle HMI or other aspects of the vehicle's monitoring system at 655.

Figure 7:
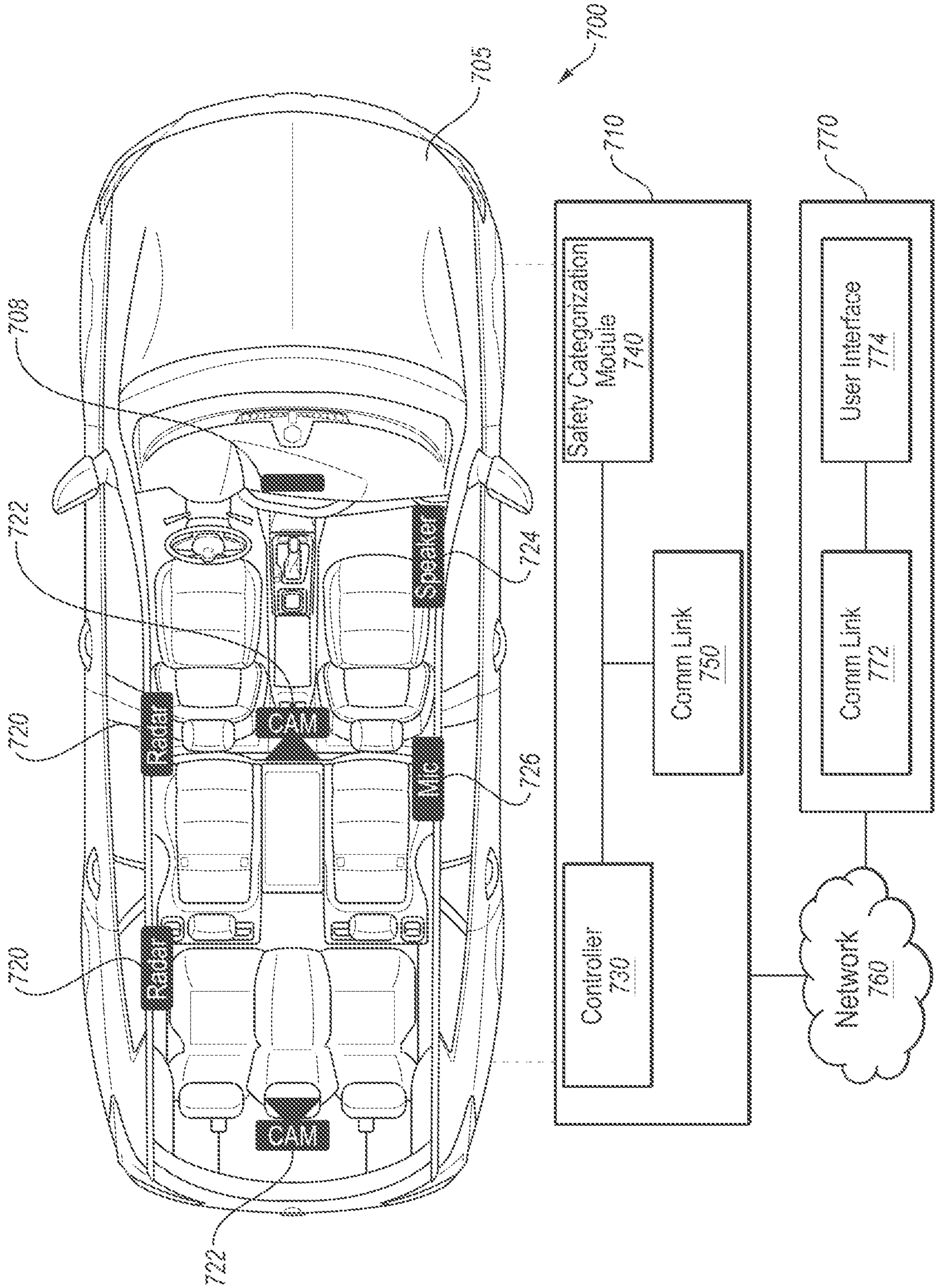
FIG. 7 depicts a system for remotely monitoring the safety of one or more vehicle occupants, such as children, according to some embodiments.

FIG. 7 depicts a system 700 for remotely monitoring the health and/or safety of one or more vehicle occupants, such as one or more children, within the cabin of a vehicle 705. As shown in this figure, one or more sensors may be positioned at various locations within the cabin of vehicle 705. In the depicted embodiment, vehicle 705 comprises six sensors, two of which are RADAR sensors 720, two of which are cameras 722, such as visible light cameras/sensors or NIR cameras, one of which is a speaker 724, and another is a microphone 726.

Again, a variety of alternative configurations are possible. For example, greater or fewer numbers of RADAR sensor 720 and/or cameras 722 may be used. Alternative types of sensors, including any of the sensors mentioned here, equivalents, and/or other sensors available to those of ordinary skill in the art, may be used. Any such sensors may also be placed at different locations as desired within the vehicle. For example, if a seat or subset of the seats in the vehicle are designated for children, various sensors may be particularly placed near and/or targeted towards such seat(s).

One or more of the various sensors may be configured to direct electromagnetic signals to and/or receive electromagnetic signals from particular regions of the cabin of vehicle 705, preferably so as to at least be capable of detecting movements and/or characteristics of occupants, such as children in preferred embodiments, within one or more seats of the vehicle 705. In some cases, all of the seats of the vehicle 705 may be targeted for possible monitoring.

Other sensors may be configured to detect other conditions within the vehicle 705 and/or relating to one or more of the occupants in the vehicle 705. For example, temperature sensors may be used to detect the ambient temperature in the vehicle. Other temperature sensors, such as infrared sensors, thermal cameras, cellular thermometers, seatbelt sensors, accelerometers, gyroscopes, and the like may be used to collect, transmit, and/or receive additional data that may be useful for remote monitoring.

Irrespective of the placement, number, and type of sensors used in the vehicle, in preferred embodiments, such sensor(s) may be used to identify one or more occupants, such as children in preferred embodiments, present in the cabin, identify data indicative of the health and/or safety of such occupant(s), and/or allow for interaction between occupants and a remote device user. For example, in some embodiments, vital sign data, such as breathing rates, tidal volume changes, and/or heart rates, for example, may be detected using the sensor(s). Other types of data used useful for remote monitoring include, for example, seatbelt position data (such as data indicated that a seatbelt is unbuckled, loose, and/or improperly positioned/used), body position data, airbag sensor data, skin temperature data, unexpected object data (such as objects in the mouth of a child), choking/breathing data, carbon dioxide and/or carbon monoxide concentrations, or other concentrations within the ambient air of the vehicle, sounds within the vehicle, accelerometer and/or gyroscope data, video feeds, etc.

In some embodiments, one or more of the various sensors in the vehicle may comprise sensor modules that may further comprise various other software, hardware, and/or firmware elements as desired in order to send and receive signals for processing by other modules. Although preferred embodiments may comprise and/or be limited to electromagnetic radiation sensors, it is contemplated that sensors 720/722 may instead, in some embodiments, comprise any other sensor as desired, such as a scale/weight/pressure sensor, temperature sensor, thermal imaging sensor, seat belt sensor, airbag sensor, any other sensor mentioned herein, or the like, for example.

System 710 further comprises a controller 730, which may be configured to process data from sensors/sensor modules 720/722. As used herein, the term "controller" refers to a hardware device that includes a processor and preferably also includes a memory element. The memory may be configured to store one or more of the modules referred to herein and the controller 730 and/or one or more processors may be configured to execute the modules to perform one or more processes described herein.

Vehicle 705 may further comprise a monitoring system 710, which may receive data from any of the various sensors, including sensors 720, 722, 724 and/or any of the alternative sensors mentioned herein. System 710 may also be coupled with other components of the vehicle, such as speaker 724 and user interface/display 708 to allow for communication between the cabin of the vehicle 705 and a remote device 770.

System 710 further comprises a safety categorization module 740 that is communicatively coupled with one or more (or all) of the sensors/sensor modules 720/722 of the vehicle 705. Of course, in some embodiments, a separate detection module may be provided for each sensor and/or sensor module, if desired. Safety categorization module 740 may be configured to receive sensed data from the various sensors/sensor modules and attempt to identify/detect occupants within vehicle 705 using such data, such as by detecting evidence of breathing or another vital sign, as described above and throughout this disclosure. Additionally, or alternatively, safety categorization module 740 may be used to generate, collect, and/or process data useful for categorizing one or more children or other occupants in various safety/health categories based upon various movements, objects, features, characteristics associated with the data obtained from the sensor(s).

The data received, generated, and/or processed by safety categorization module 740 may be displayed on a display and/or user interface 708, which is preferably easily accessible by the driver of vehicle 705 (although for autonomous vehicles this need not be the case). In addition, some or all of this data, in some cases in addition to data from other components, such as microphone 726, may be selectively transmitted to remote device 770, as discussed above in connection with method 600.

Thus, a communications link 750 within system 710 may be used to transmit data via network 760 to a communications link 772 on the remote device. As those of ordinary skill in the art will appreciate, a wide variety of networks, network devices/components, and/or network protocols may be used. For example, network 760 may include, at least in part, one or more of a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, or any combination thereof. Of course, since data will typically be transmitted from the vehicle 705 to a remote device 770, preferably at least a portion of network 760 is wireless.

For example, in some embodiments, upon detecting a particular condition and/or a transition from one status, category, and/or classification of conditions to another, data from safety categorization module 740 and/or one or more of the other sensors and/or other components of the system 710 within vehicle 705, such as an alert and/or data to facilitate communication between the remote device 770 and one or more of the occupants within vehicle 705 may be transmitted to remote device 770 via network 760. Some such data may be transmitted automatically upon one or more triggers, some of which triggers may be set by the user and some of which may be configured by default.

For example, upon detecting a particular condition of a child within the vehicle 705, either by selective configuration by the user or by the system by default, an alert, including visible, audible, and/or haptic aspects, may be sent to a user interface 774 on remote device 770. If the condition is considered critical or urgent, the alert may be made more noticeable and/or may also result in automated activation and/or transmission of live audio and/or video feeds to the remote device 770 of the child/occupant being monitored with the detected condition. For example, the volume of the audio portion of the alert may be raised for urgent alerts, the visible portions may be larger, may include different colors, may flash repeatedly, or otherwise be more prominent, and/or the haptic portion may be more pronounced and/or may include a specific vibrational pattern. In some cases, urgent alerts may be configured to override the user's mute/silent settings on the remote device 770.

Some or all of the data displayed on user interface 774 may also be displayed on user interface 708, which may comprise a human machine interface in some embodiments. For example, in some embodiments and related implementations, various specific warnings and/or actions may be associated with each of the safety state categories. For example, upon detecting a condition indicative of a particular safety state category, such as a highest safety state category, the system 710 may be configured to provide a warning, such as a visual warning, on display/interface 708, which may also be simultaneously displayed on display/interface 774, if desired. This warning may be identical or may be different on the two displays.

An audible warning may also be provided on one or more speakers 724 in vehicle 705, which may be speaker(s) dedicated to system 710 or may be speakers that are provided and used as part of the sound system in vehicle 705. Again, the audible warning may also be provided on a speaker of remote device 770 and may be the same or different from the one provided within the vehicle 705.

Similarly, a tactile and/or haptic warning, such as a vibrational notification, may be provided to the remote device 770 and/or within the vehicle 705, such as within one or more of the seats of vehicle 705. Again, the pattern of the haptic alert may be the same in both cases or may differ according to the preferences of the user(s).

Some embodiments and implementations may also be configured to take other actions, such as displaying a live video display of the particular seat or seats within which the triggering condition(s) was detected. The same video display may be sent to display/interface 774 and 708 in some cases. However, in some cases, such as in connection with certain conditions and/or condition categories, the display/interface 774 may include a live video and/or audio feed of the occupant being monitored or, alternatively, the driver or another selected seat in the vehicle considered to be associated with an adult and/or caregiver of the occupant being monitored.

Similarly, the display/interface 708 within the vehicle 705 may, as previously mentioned, display the occupant being monitored or, alternatively, may be used to display a live video and/or audio feed from the remote device 770. In this manner, a caregiver or other remote user of remote device 770 may be able to communicate with occupants in the vehicle with both sides able to see and/or hear the other.

As previously described, in preferred embodiments and implementations, the displays/user interfaces 708 may be configured to display icons to the driver and/or another occupant of vehicle 705 to provide an immediate visual indicator for a current condition and/or safety state category of one or more of the child occupants. This same icon, or another similar icon, may be transmitted for display on user interface/display 774, if desired.

In some such embodiments and implementations, there may be an icon associated with each of the child/children in the vehicle 705 and a separate, secondary or supplemental icon for a particular condition that has been detected. In some such embodiments and implementations, the child icon may have a distinct color indicative of a current safety state category of the child to a driver or other occupant of the vehicle on a display and/or user interface. This color may be displayed on the entire icon, or only a portion thereof, such as just an outline of the icon or a portion thereof, as mentioned in greater detail below. Again, this same display configuration/pattern may be sent to user interface/display 774, or another similar configuration as may be selected by the user of remote device 770.

Figure 8:
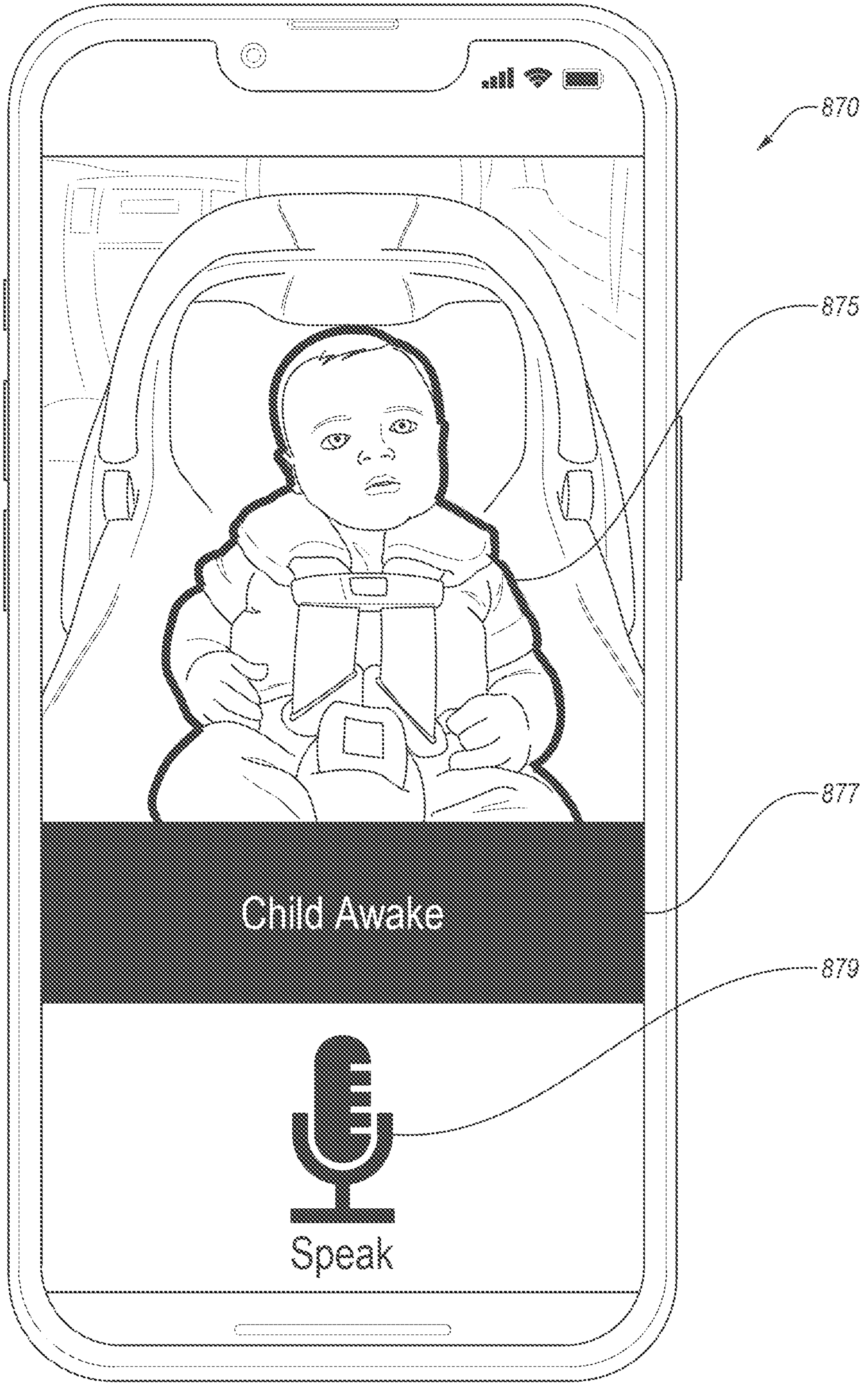
FIG. 8 depicts a screenshot of a remote, electronic device incorporating an application for remotely communicating with a vehicle having a safety monitoring system.

FIG. 8 is a screenshot of a user interface of a remote device 870 according to some embodiments. As previously mentioned, this user interface may, in some cases, be part of an app loaded on a smartphone or other electronic device. As shown in this figure, a child/occupant 875 is shown on the display. Preferably, this is a snapshot of a live video feed, although in some alternative embodiments a static image may be displayed to conserve bandwidth.

As also shown in FIG. 8, in some embodiments, an outline may be overlayed around the child, which outline may be of a color corresponding with the condition detected, either individually or within a category of conditions. For example, if the condition being detected is of particular concern, either by default or by selection by a user, the outline may be red and/or may be configured to flash. Other colors may be configured to correspond with other conditions or classifications/categories of conditions. In some cases, all conditions, or certain conditions or classifications/categories of conditions may result in no outline being provided. In other words, this may be an option for the user(s).

In some embodiments, when a remote device user opens the app and/or a particular feature of the app, a live camera view, preferably with live audio, may be displayed. In some embodiments, this display may include an outline and/or overlay, such as a colored overlay, this extends adjacent to and/or around (either fully or partially) an area of interest according to the condition detected. For example, the overlay/outline may extend around an occupant's mouth for choking/spit up alerts, nose for breathing alerts, seatbelt for seatbelt alerts, face for crying/discomfort alerts, body for unsafe body conditions, etc. The color of the overlay/outline may provide further information about the condition and/or category of the condition. Alternatively, or additionally, colored icons and/or text may be used to provide further information regarding the condition(s).

The screenshot of FIG. 8 further comprises an alert 877. In this case, the alert 877 is a text message, which may be accompanied by other visual features, such as a color surrounding the text, as generally indicated in the figure, and/or other visual elements. For example, in some embodiments, an icon may be displayed, which may include the icons previously mentioned in connection with the local occupant monitoring systems and methods, such as systems 100 and 200 and method 300. Again, these icons may be indicative of a particular monitoring category and may be sent to the remote device 870, in some cases along with alert 877, in addition to or as an alternative to displaying them on a local display screen/interface within the vehicle.

The alert 877 may be accompanied not only by other visual features, such as the aforementioned outline and/or flashing, but an audio aspect and/or haptic aspect. For example, because the depicted example is of the child waking up, an alarm clock sound may be played with the alert 877. In addition, or alternatively, a haptic alert, such as a three-pulse vibration burst, may be triggered on the remote device 870. As previously mentioned, these sounds and/or haptic patterns may, in some cases, be selectively programmed by the user(s).

The screenshot of FIG. 8 further comprises a functional icon 879, which in this case comprises an icon 879 indicating the ability to speak to the child being monitored. In some cases, this icon 879 may require a user of the remote device 870 to press the icon 879 in order to speak to the child. Alternatively, however, the icon 879 may not be interactive. In other words, the icon 879 may simply indicate that the user's voice is now being transmitted to the vehicle/child without requiring the user to actuate this function. Similarly, the icon may instead be one that indicates a current category, status, or condition of the child, as detected within the vehicle monitoring system, including but not limited to those icons previously mentioned.

Figure 9:
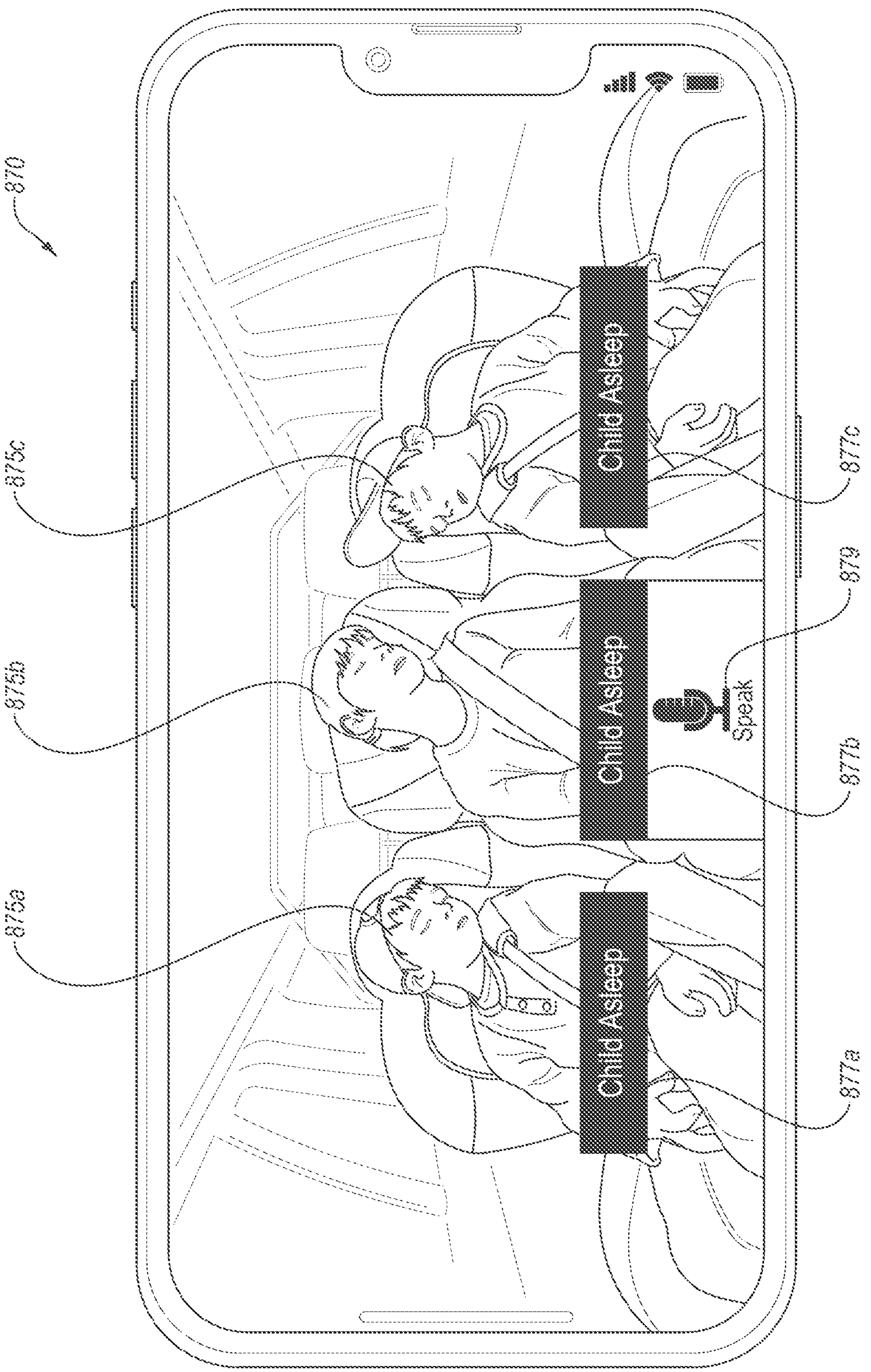
FIG. 9 is another screenshot of the electronic device incorporating an application for remotely communicating with a vehicle having a safety monitoring system.

If multiple occupants within the vehicle are being monitored, in some embodiments, the application on the remote device 870 may be configured to automatically show all of the occupants, if there are more than one, having an active alert. An "active" alert may be considered one that has happened within a relatively recent time period and/or those that have not yet been viewed and/or removed, such as swiped away. In some cases, all of the users having an active alert may be displayed together, as shown in the screenshot of FIG. 9. Alternatively, or additionally, the app may be configured to allow a user to swipe left/right or otherwise select a specific occupant or row of occupants from among those having an active alert to view.

In some cases, the app may be configured to switch from a view of a specific occupant, such as an occupant having an active alert, to a view depicting multiple occupants, such as the view of FIG. 9. In some such embodiments/implementations, this may be done by simply rotating the remote device 870 into a landscape mode. This feature may be configured to automatically depict all occupants in the vehicle, or all occupants in a particular row of the vehicle (such as the row having one or more occupants with an active alert), irrespective of whether they have an active alert, or may be configured to depict all occupants having an active alert, irrespective of whether they are in the same row. The app may, in some embodiments, further allow the user to swipe, tap, or otherwise select particular occupants within the current display for enlargement (i.e., a single occupant and/or a single occupant's monitoring data being displayed) and/or swipe, tap, or otherwise select particular rows in the vehicle such that all occupants within this row can be viewed.

The screenshot of the remote device 870 of FIG. 9 includes three occupants 875*a*, 875*b*, and 875*c*. As indicated by the corresponding three visual notifications 877*a*, 877*b*, and 877*c*, each of the three occupants 875*a*, 875*b*, and 875*c* is asleep. Thus, notifications 877*a*, 877*b*, and 877*c* may not necessarily be considered "alerts" (although it is contemplated that users may be able to set up falling asleep as an alert if so desired). That is, they may not be automatically displayed on the remote device 870, but rather may be viewed selectively when a user of the remote device 870 decides to open the app and check on the vehicle occupants. Of course, in other cases, visual notifications 877*a*, 877*b*, and 877*c* may also be configured as alerts. For example, a user may wish to be notified when one or more of the occupants 875*a*, 875*b*, and 875*c* has awakened, or has fallen asleep. As previously mentioned, such notifications/alerts 877*a*, 877*b*, and 877*c* may therefore be accompanied, if desired, by corresponding audible and/or haptic alerts as well.

In addition, one or more other icons, such as functional icon 879, may be displayed. Again, icon 879 indicates the ability to speak to the occupants being monitored. As previously mentioned, this icon may indicate that the user of the remote device 870 can optionally press the icon to speak with one or more of the occupants 875*a*, 875*b*, and 875*c*, or may indicate that the microphone on the remote device 870 is currently active and therefore the user can simply speak to the occupants presently into a microphone of the remote device 870.

In some embodiments, a user may be able to automatically switch from a single-occupant viewing mode, such as is shown in FIG. 8, to a multiple-occupant viewing mode, such as is shown in FIG. 9, simply by rotating a phone loaded with the remote child/occupant monitoring system app thereon to a landscape orientation. However, in some such embodiments, or as an alternative in other embodiments, a user may be able to otherwise select an appropriate view, including any or all of the occupants in the vehicle, by selecting them through a suitable menu and/or user interface. Again, preferably, the app is set up to automatically depict any occupants for which a sufficiently critical alert, notification, condition, and/or category change has been detected without requiring additional user action.

As another specific example of how the functionality of a remote monitoring system may operate, assume a child wakes up in a parked, vacant non-autonomous vehicle. Depending upon the user's settings/configuration, this may result in the app issuing a notification on the remote device that could include text saying something along the lines of "waking child." A colored icon, such as a red icon of a child with eyes open, may also be sent to the remote device, along with a sound clip, such as an alarm clock sound. A haptic pattern may also be sent to the remote device, such as a three-pulse vibration burst.

Some embodiments and/or implementations may further comprise an administrator management feature. This may allow for administrator control of the system such that other users of the vehicle will need administrator permission to pair the app to the vehicle. The administrator, or in some cases other users after having been given proper permission, may control the behavior of the system for other users.

For example, the administrator and/or other authorized user(s) may be able to receive an alert when the remote device exceeds a predetermined (and in some cases, configurable) distance from the vehicle, receive an alert when the remote device exceeds a predetermined (and in some cases, configurable) distance from the vehicle, in some cases for a configurable amount of time, and/or may grant permission to one or more additional users to pair the app/remote device to the vehicle/system.

In some cases, the administrator and/or authorized users may be able to monitor the location of other users and/or the occupants while the system is in use. The administrator may receive alerts when the other user exceeds a configurable distance from the vehicle if the occupants are left in the vehicle. The administrator may also receive alerts when the other user exceeds a configurable distance from the vehicle for a configurable amount of time if the occupants are left in the vehicle. The administrator and/or other users may also be able to selectively initiate an audio and/or video conference call with the occupants of the vehicle.

Some embodiments may include security features for remote device enrollment. For example, enrollment may require permission from the administrator and/or primary vehicle owner. In some cases, this permission/security feature, such as a token, may be initially paired with the vehicle at the dealership and then transferred/granted as appropriate/desired. For example, the primary owner and/or administrator may be allowed to grant varying levels of permissions to other devices/users, such as the ability to enroll further devices or only receive alerts.

As used herein, a software module or component may include any type of computer instruction or computer executable code located within a memory device and/or m-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Furthermore, embodiments and implementations of the inventions disclosed herein may include various steps, which may be embodied in machine-executable instructions to be executed by a general-purpose or special-purpose computer (or another electronic device). Alternatively, the steps may be performed by hardware components that include specific logic for performing the steps, or by a combination of hardware, software, and/or firmware.

Embodiments and/or implementations may also be provided as a computer program product including a machine-readable storage medium having stored instructions thereon that may be used to program a computer (or other electronic device) to perform processes described herein. The machine-readable storage medium may include, but is not limited to: hard drives, floppy diskettes, optical disks, CD-ROMs, DVD-ROMs, ROMs, RAMS, EPROMS, EEPROMs, magnetic or optical cards, solid-state memory devices, or other types of medium/machine-readable medium suitable for storing electronic instructions. Memory and/or datastores may also be provided, which may comprise, in some cases, non-transitory machine-readable storage media containing executable program instructions configured for execution by a processor, controller/control unit, or the like.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. A method for remote monitoring of a child within a vehicle, the method comprising the steps of:

receiving a signal in a vehicle from a remote device requesting that one or more seats in the vehicle be monitored;

monitoring a child within the one or more seats using one or more sensors positioned within a cabin of the vehicle to attempt to identify a plurality of status indicators relating to the child;

processing signals received from the one or more sensors to categorize a current safety state of the child within one of a plurality of safety state categories using the plurality of status indicators from the one or more sensors, wherein at least one of the plurality of safety state categories includes a plurality of distinct conditions;

transmitting a signal to the remote device indicative of a real-time safety state of the child within a corresponding safety state category of the plurality of safety state categories;

determining whether the remote device is within the vehicle;

upon determining that the remote device is not within the vehicle, entering a remote device monitoring mode, wherein the remote device monitoring mode adds and/or changes monitoring features within the remote device;

receiving an assignment from a user of a sound and/or a haptic vibration pattern to a condition and/or safety state category of the child;

detecting a condition of the child corresponding to the assignment; and transmitting a signal to the remote device, wherein the signal is configured to trigger the remote device to issue an alert, the alert comprising the sound and/or haptic vibration pattern.

2. The method of claim 1, wherein each of at least a subset of the plurality of status indicators comprises a safety status indicator.

3. The method of claim 1, wherein the remote device comprises a mobile application stored on an electronic device and configured to electronically communicate with the vehicle.

4. The method of claim 1, further comprising, upon determining that the remote device is within the vehicle, entering a local device monitoring mode, wherein the local device monitoring mode removes and/or changes monitoring features within the remote device.

5. The method of claim 1, wherein the remote device monitoring mode comprises delivering alerts to the remote device indicative of a real-time safety state of the child within a corresponding safety state category of the plurality of safety state categories.

6. The method of claim 1, wherein the remote device monitoring mode comprises facilitating real-time communication between the remote device and the vehicle.

7. A method for remote monitoring of an occupant within a vehicle, the method comprising the steps of:

monitoring an occupant within a vehicle using one or more sensors positioned within a cabin of the vehicle;

correlating sensed data obtained during the monitoring step with a preconfigured set of conditions to identify a match between the data and at least one condition among the set of conditions;

identifying a current condition of the occupant from the sensed data;

transmitting an alert to a remote device of the condition;

categorizing the at least one condition within one of a plurality of safety state categories;

including an indicator of the at least one condition with the alert transmitted to the remote device, wherein the indicator comprises an icon, a sound, and/or a haptic vibration pattern; and receiving customization data from the remote device, the customization data comprising an assignment of an icon, a sound, and/or a haptic vibration pattern to a condition and/or a safety state category.

8. The method of claim 7, wherein the occupant is a child.

9. The method of claim 8, further comprising:

using a GPS sensor to obtain a current location of the remote device and/or the vehicle;

obtaining data relating to a legal framework within the current location regarding leaving children within a vehicle; and updating a function of a system for automated monitoring of the child within the vehicle according to the legal framework.

10. The method of claim 9, wherein the step of updating a function comprises changing the parameters under which an alert will be sent to the remote device when the child is in the vehicle without adult supervision.

* * * * *